Aug. 29, 1933.　　H. B. SCOTT ET AL　　1,924,293
ENGRAVING MACHINE
Filed Oct. 8, 1928　　9 Sheets-Sheet 2
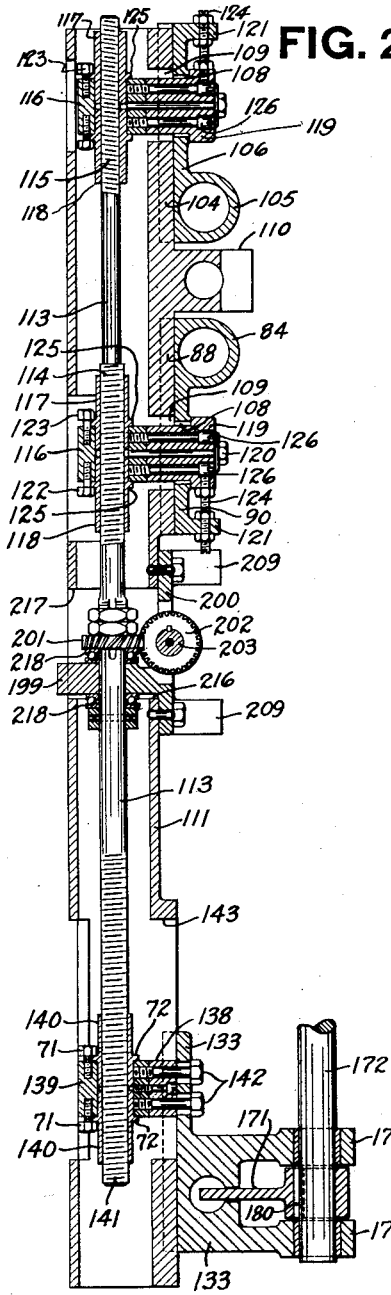
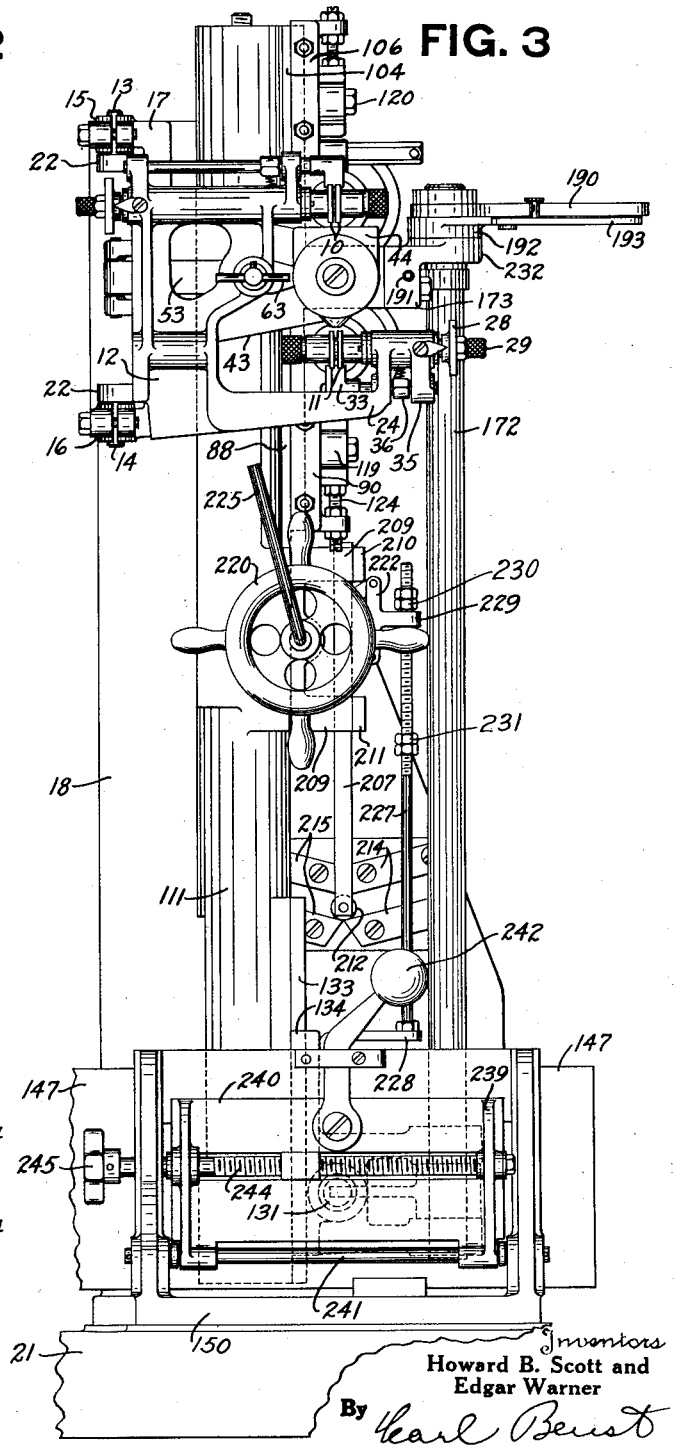
Inventors
Howard B. Scott and
Edgar Warner
By
His Attorneys Aug. 29, 1933.  H. B. SCOTT ET AL  1,924,293
ENGRAVING MACHINE
Filed Oct. 8, 1928  9 Sheets-Sheet 3
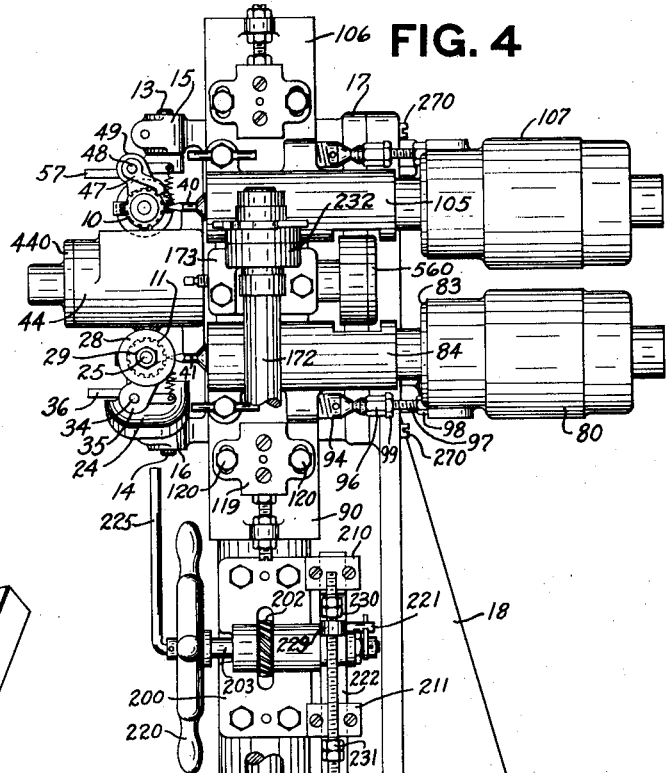
FIG. 4
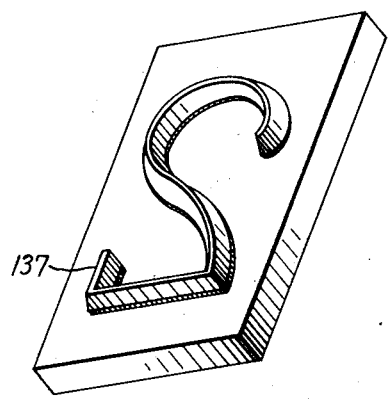
FIG. 31
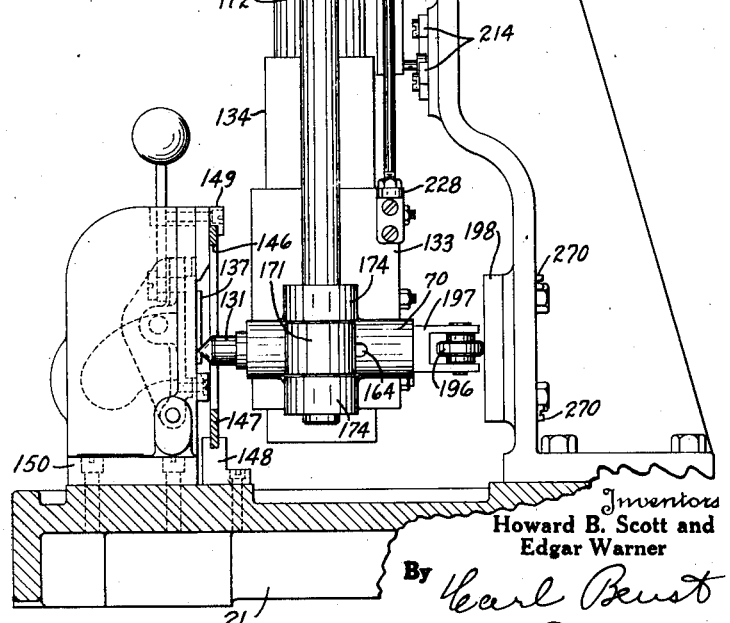
Inventors
Howard B. Scott and
Edgar Warner
By Earl Brust
Ralph S. Warfield
His Attorneys

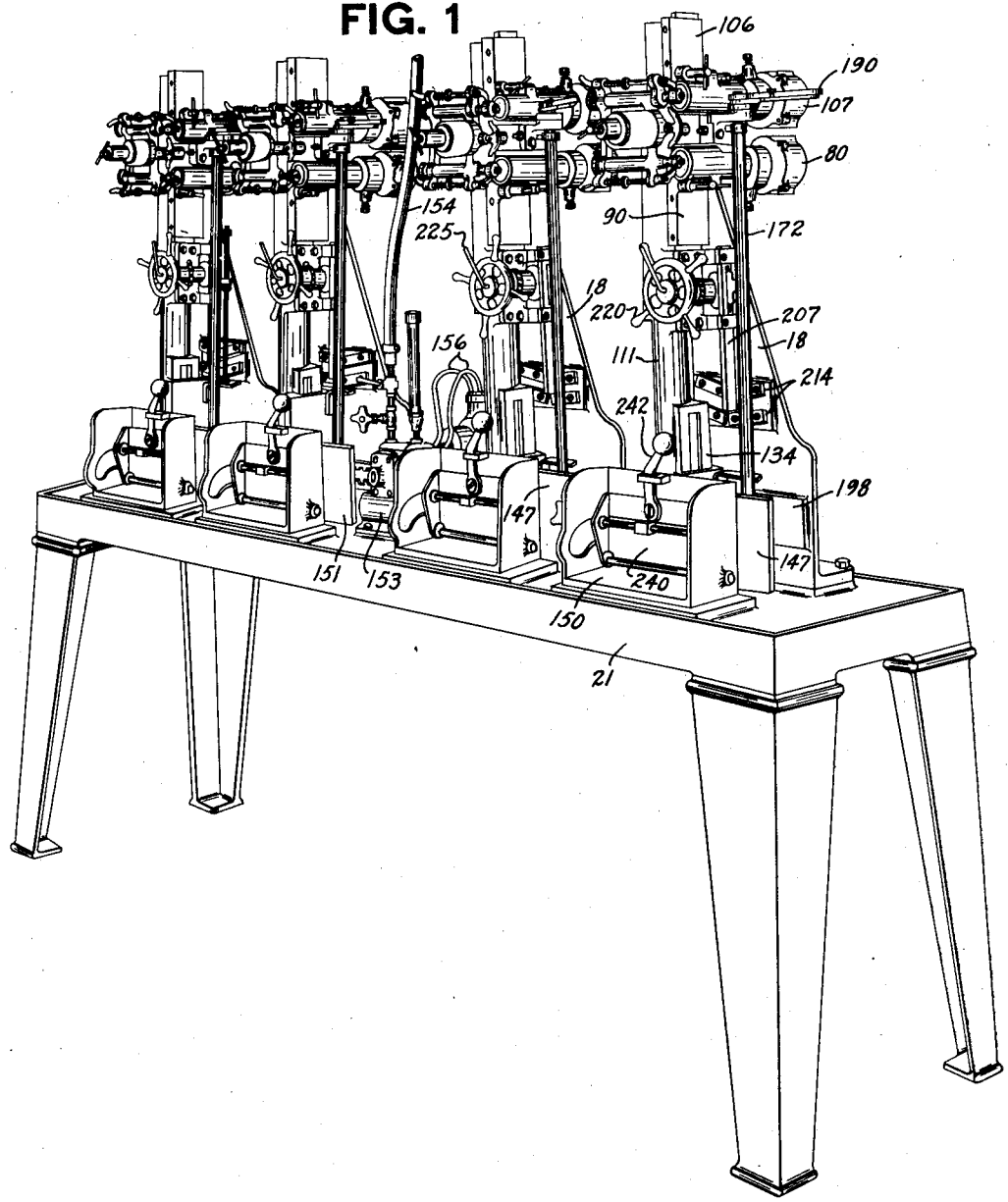

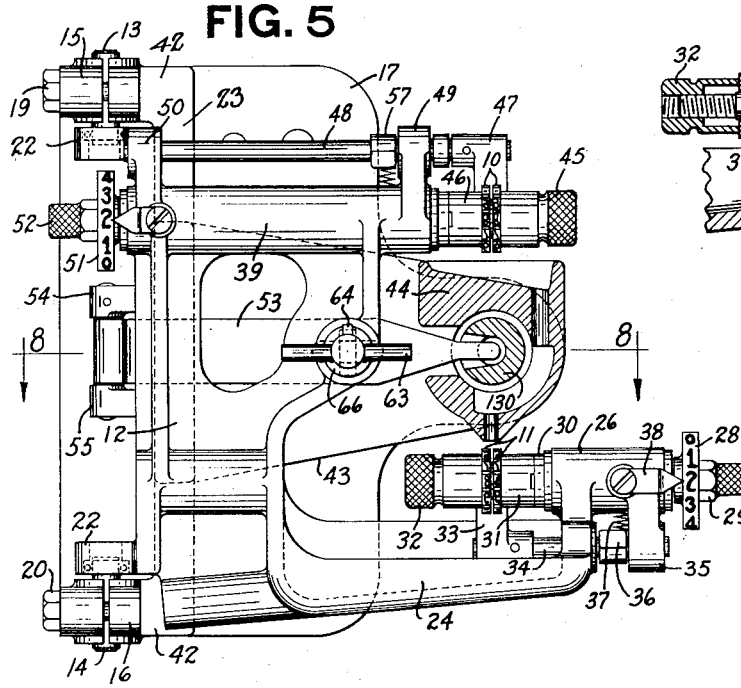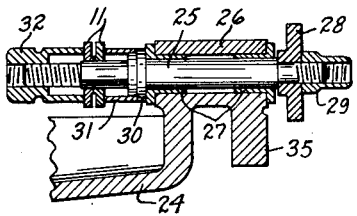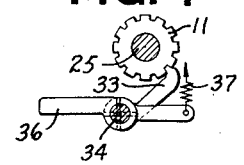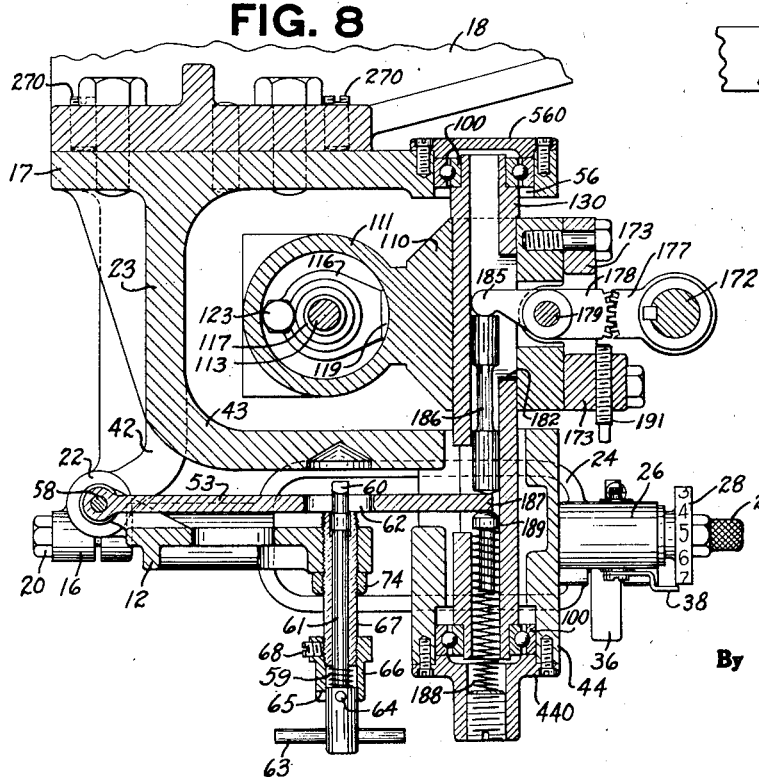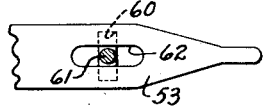

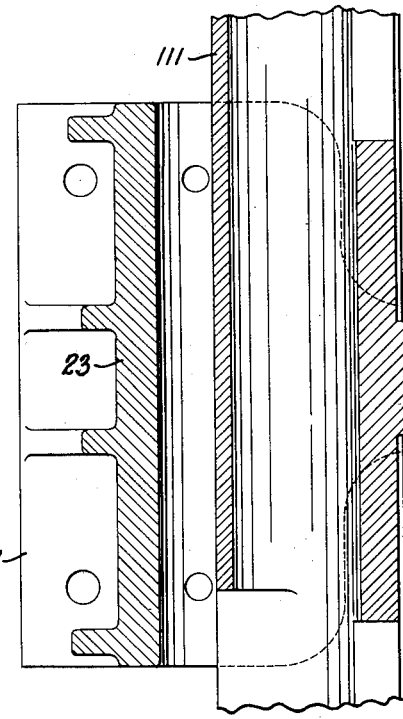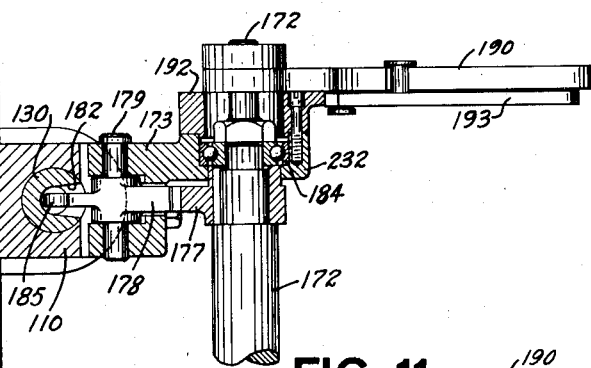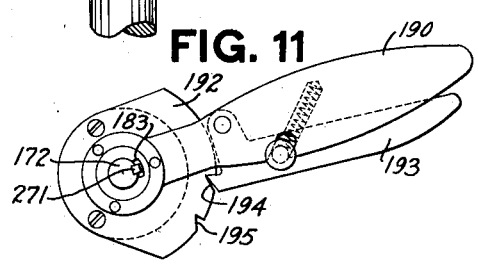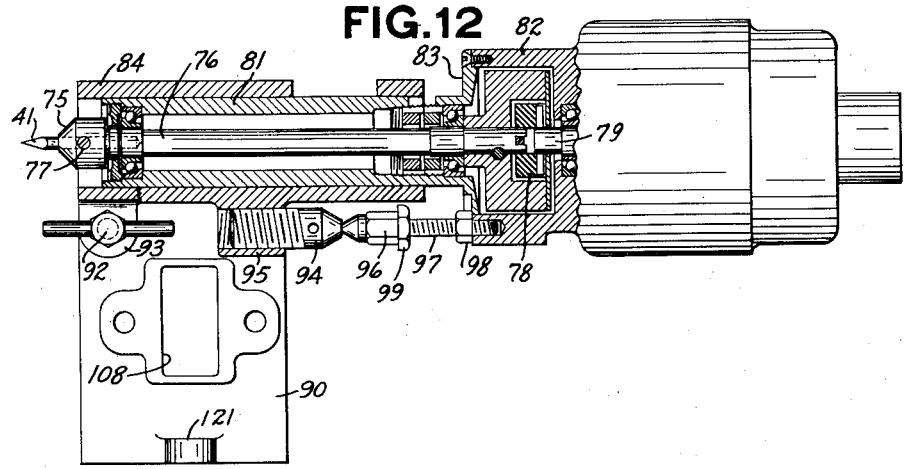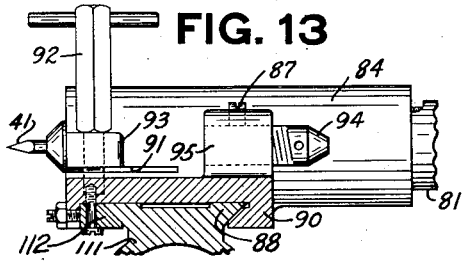

Aug. 29, 1933.  H. B. SCOTT ET AL  1,924,293
ENGRAVING MACHINE
Filed Oct. 8, 1928  9 Sheets-Sheet 6
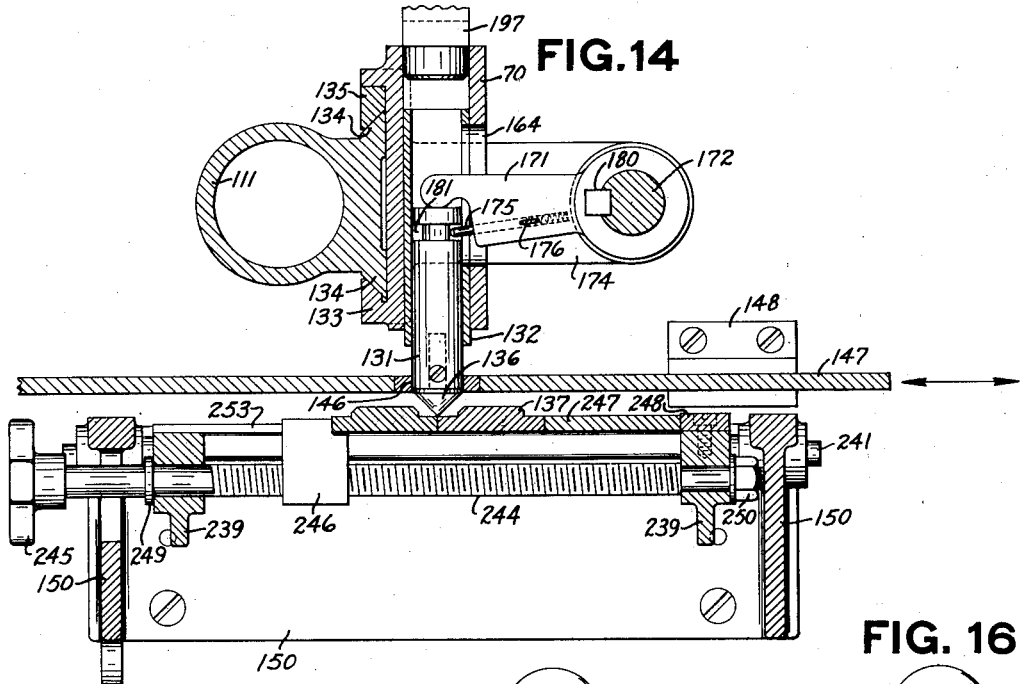
FIG. 14
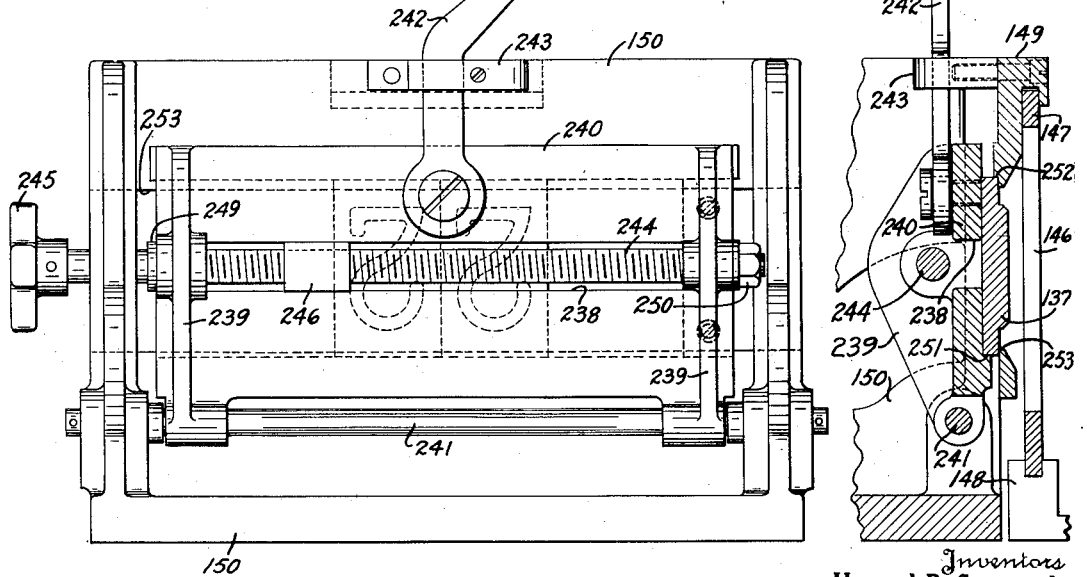
FIG. 15
FIG. 16
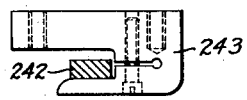
FIG. 17
Inventors
Howard B. Scott and
Edgar Warner
By Carl Beust
Ralph E. Warfield
His Attorneys

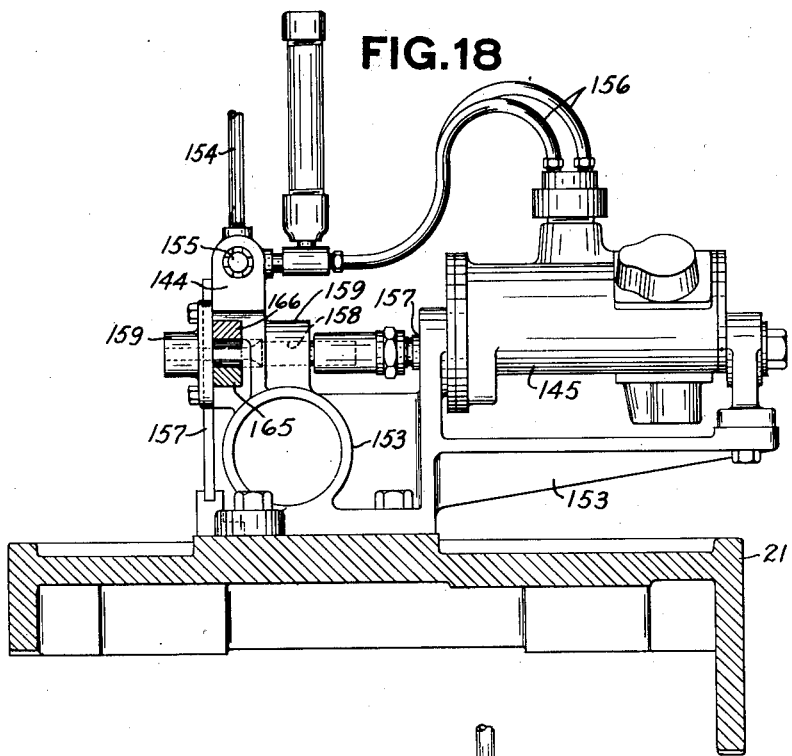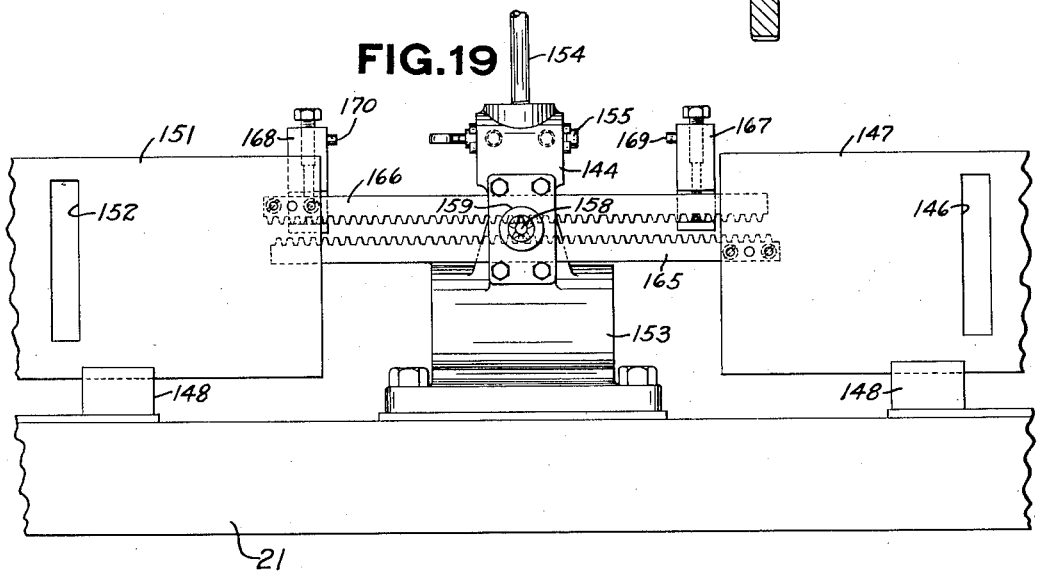

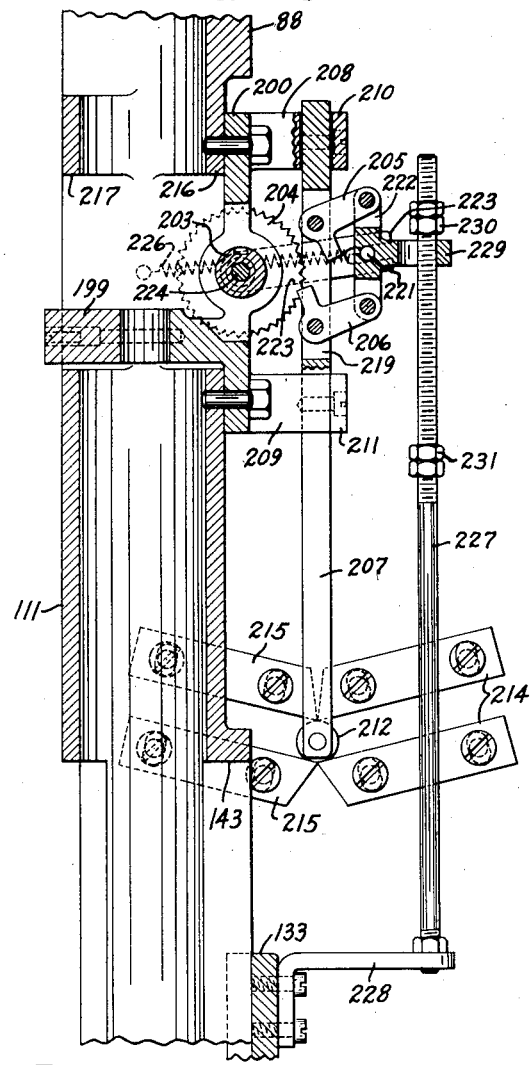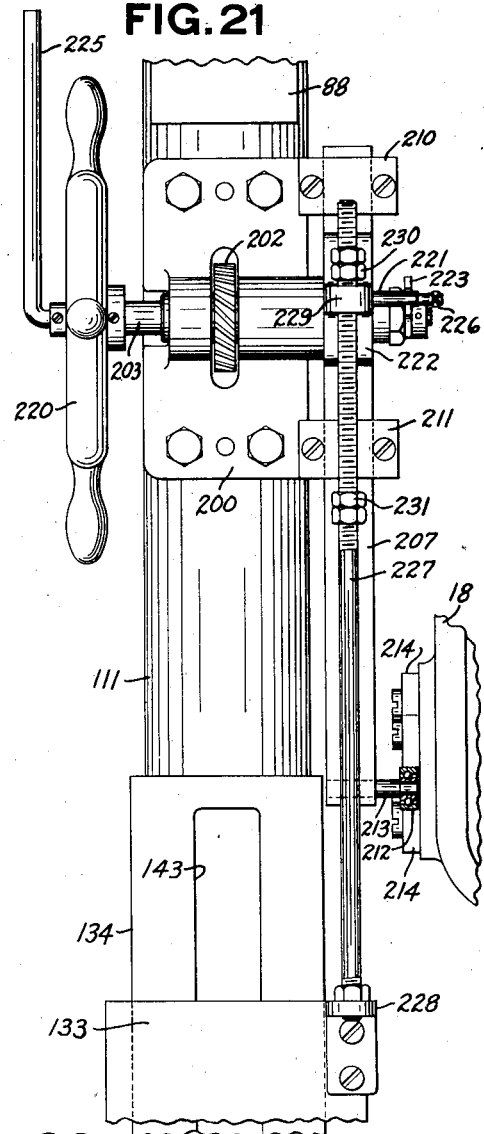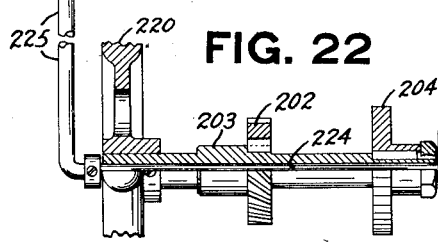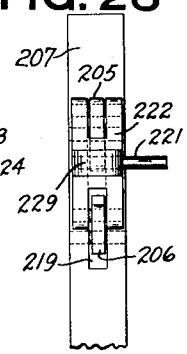

Aug. 29, 1933.  H. B. SCOTT ET AL  1,924,293
ENGRAVING MACHINE
Filed Oct. 8, 1928  9 Sheets-Sheet 9
FIG. 24
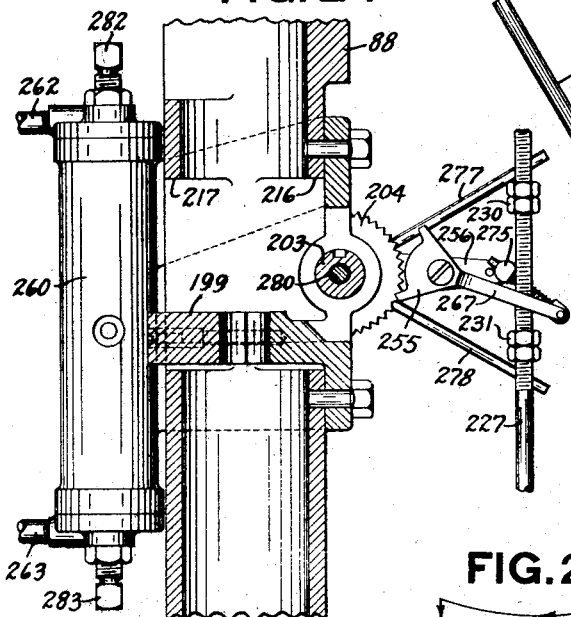
FIG. 25
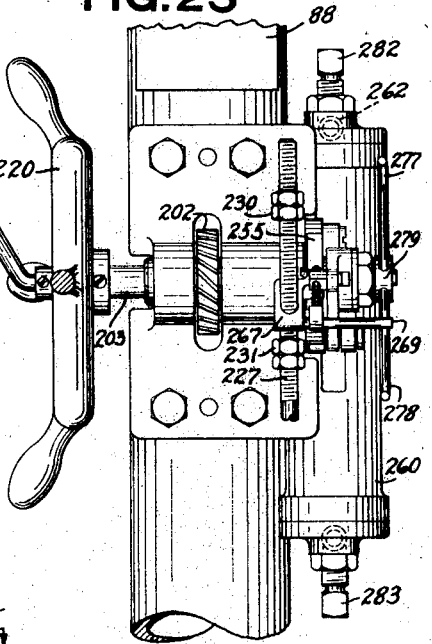
FIG. 27
FIG. 26
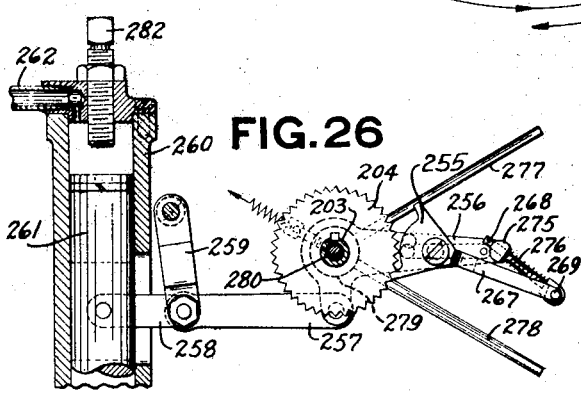
FIG. 28
FIG. 29
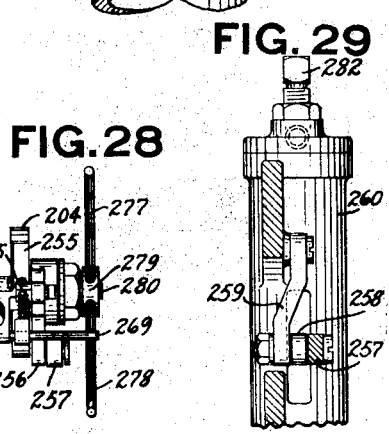
FIG. 30
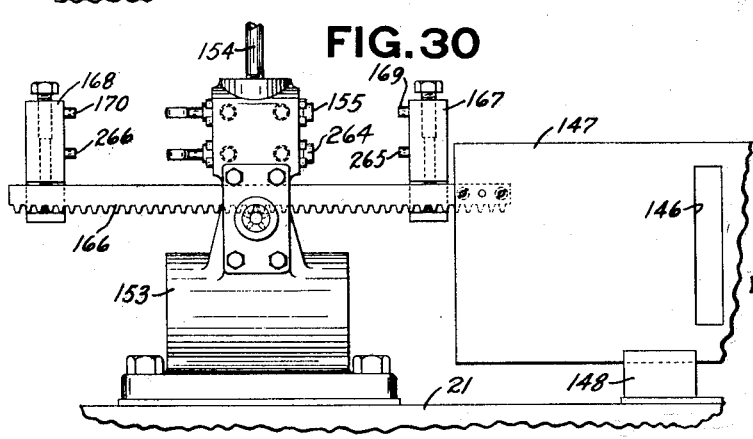
Inventors
Howard B. Scott and
Edgar Warner
By
His Attorneys Patented Aug. 29, 1933

1,924,293

UNITED STATES PATENT OFFICE 1,924,293

ENGRAVING MACHINE

Howard B. Scott and Edgar Warner, Dayton, Ohio, assignors to The National Cash Register Company, Dayton, Ohio Application October 8, 1928. Serial No. 311,092

56 Claims. (Cl. 90—13.8)

This invention relates to metal working machinery and more particularly to engraving and like machines.

One of the objects of this invention is to provide a novel automatic engraving machine, wherein the lateral and vertical traverse operations are readily adjusted to the kind of work to be performed, the depth of cut being directly controlled by the master plate, and novel means being provided to enable the operator to interrupt the engraving operation at will, without throwing the power off the motor.

Another object of this invention is to provide an engraving machine capable of engraving steep or abrupt sided characters or outlines on type wheels, segments, disks, or any other shaped type carrier, such as are used in cash registers, calculating and like machines, or on other work, from a master plate on which the sides of the characters or outlines have a gentle slope or incline.

Still another object is to provide an engraving machine with unitary cutting and driving mechanisms, including cutter spindles having individual driving motors adapted for ready insertion in and removal from the machine, adjustable stops being provided, by which the motor, spindle and cutter may be more quickly and readily replaced as a unit, with the tip of the cutter in proper position with respect to the work.

A further object is to provide an engraving machine with novel means to feed the cutting tool across the face of the work.

A still further object is to provide an engraving machine with novel means to shift the work to and from the cutting means under the control of a master plate.

Still another object is to provide an engraving machine with novel means to cause a tracer to automatically traverse the surface of a master character in directions substantially at right angles to each other.

Another object is the provision, in an engraving machine, of a tracer which automatically traverses a master character and exercises such control over the cutter that the latter is given movements having a greater ratio for depth than for width and height.

Further objects are to enable the master plates to be quickly and easily presented to the tracer finger; to hold the plates where adjusted, and to readily remove the plates when desired.

Another object is the utilization of the swinging movement which causes the tracer to travel laterally of the master plate, to feed the tracer vertically, the vertical movement of the tracer being timed to occur at each end of a lateral stroke.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 1 is a perspective view of an engraving machine constructed in accordance with one form of the invention, and containing a plurality of engraving units.

Fig. 2 is a vertical sectional view taken through the swinging column of one of the engraving units to show the vertical feed for the cutter and tracer mechanisms.

Fig. 3 is a view in front elevation of an engraving unit.

Fig. 4 is a view in right elevation of an engraving unit.

Fig. 5 is a view in front elevation, partly in section, of the work carrier and its support.

Fig. 6 is a detail longitudinal sectional view of one of the work-supporting mandrels mounted in the work carrier.

Fig. 7 is a detail view of a work-retaining detent.

Fig. 8 is a cross-sectional view taken on line 8—8 of Fig. 5, showing the work carrier, and associated parts.

Fig. 9 is a fragmentary detail side view of the operating finger for the work carrier and the latch to connect the carrier and the finger.

Fig. 10 is a sectional detail view, showing the method of mounting the upper end of the tracer shaft, together with the manual throwout or control lever for the machine.

Fig. 11 is a top plan view of the manual control or throwout lever.

Fig. 12 is a detail side view, partly in section, of one of the unitary cutting tool assemblies, including a cutter spindle, the driving motor therefor, and the supporting slide rest.

Fig. 13 is a detail view, partly in section, of the spindle sleeve and slide rest, showing particularly the manner of clamping the spindle slide rest to its track or rail.

Fig. 14 is a horizontal sectional plan view through the master plate holder and the tracer slide rest.

Fig. 15 is a view in front elevation of the master plate holder.

Fig. 16 is a vertical cross-sectional view through the master plate holder, showing the method of clamping the master plates in the holder.

Fig. 17 is a detail view of the master plate holder latch.

Fig. 18 is a view in side elevation of the pneumatic motor for actuating the swinging columns and the tracer fingers of a plurality of engraving units.

Fig. 19 is a front view of the pneumatic motor, showing the drive and reversing mechanism for actuating the slides through which lateral movement is imparted to the cutters.

Fig. 20 is a detail sectional view of the mechanism to vertically feed the cutting tools.

Fig. 21 is a view in right elevation of the vertical feed mechanism.

Fig. 22 is a fragmentary detail view, partly broken away, of a manual feed and reverse mechanism for the cutters.

Fig. 23 is a fragmentary detail view of the vertical feed reversing yoke.

Fig. 24 is a detail view, partly in section, showing a modified form of vertical feed and reversing mechanism for the cutting tools, utilizing a pneumatic drive.

Fig. 25 is a view in right elevation of the modified feed and reversing device.

Fig. 26 is a detail view, partly in section, showing the connection of the modified pneumatic feed cylinder to the feed screws.

Fig. 27 is a diagrammatic view, greatly exaggerated, illustrating the approximate path of the tracer and of the cutters under the control of the modified pneumatic feed.

Fig. 28 is a detail view of the reversing device for the pneumatic feed.

Fig. 29 is a fragmentary view of a part of the pneumatic feed cylinder.

Fig. 30 illustrates a modified form of mechanism for driving the actuator slides and for controlling the supply of compressed air to the pneumatic motor which drives the tracer slides, and also for controlling the supply of compressed air to the pneumatic feed cylinder.

Fig. 31 is a detail perspective view of one form of master plate.

General description

Described in general terms, the machine herein illustrated includes a plurality of units mounted on a common table or bed plate, each unit of which may include a tracer mounted in a swinging column pivotally supported at the upper end of a standard. The standards for the respective units are separate from each other and all are mounted upright on the common base. Drive mechanism is provided to rock the swinging columns to cause the point of the tracer for each unit to traverse a master character or characters from side to side, which master characters are formed on a plate or plates removably supported in a holder which presents the master plates to their respective tracers. At each end of its lateral travel, the tracer of each unit is fed one step either upwardly or downwardly, an automatic arresting means being provided to arrest the feed device when the tracer arrives at the highest and at the lowest points of the master character being reproduced.

As herein shown, a common drive is provided for the swinging frames of the several units, comprising the machine, but the several units may be driven individually. This universal drive may include a plurality of reciprocatory tracer slides, one common to the two right hand units and another common to the two left hand units. Both slides are driven by a pneumatic motor of conventional design equipped with a suitable reversing mechanism. Pneumatic motors are well suited for this purpose, due to the fact that they can be quickly reversed, but any suitable power device, such as, for instance, an electric motor or water power, may be used to drive the machine.

A pair of opposed cutting spindles are preferably mounted on the swinging column of each engraving unit, each of which spindles is rotated at a high rate of speed by an electric motor individual thereto, the armature shaft of which is connected directly to the spindle. These motors are mounted on the swinging column in such a manner as to be easily removed and replaced for the purpose of grinding and repairing the cutters. Adjustable stops or locating points are provided to insure that, when replaced after grinding, the cutters shall be properly located with respect to the work.

The work, which may assume any form, as plates, segments or disks of metal or other suitable material, is supported upon a pivoted carriage normally latched to an operating or vibrating finger shiftable under the control of the tracer appropriate to the unit, to shift the work toward and away from the cutters in order to regulate the depth of the cut and surface shape of the character being reproduced. The carriage may be unlatched from the operating finger and swung outwardly to examine the work or to remove the completed work, and place blank type wheels or other work in position to be engraved.

Various controls and adjustments are provided on the machine in order to properly align the elements of the machine and control the operation thereof, as well as to throw off the drive to the cutting tools and carriage without disabling the motor, all of which will be described in detail in the specification which follows.

General structure

The form of engraving unit selected to illustrate this embodiment of the invention comprises a supporting framework, a carrier for the work being engraved, which carrier is hinged to the framework, a swinging column journaled in the framework to shift the work relatively to cutting tools mounted on the column for vertical and lateral movement relatively to the work, a master plate holder, a tracer mounted on the column to traverse the face of the master plate, means to rock the column to cause the tracer to traverse the master plate laterally, means to feed the tracer step by step in a direction at substantially right angles to its lateral travel across the master plate, and means to enable the tracer to control the work carrier to shift the work towards and from the cutting tools, all of which will be described in the order set forth.

A suitable table or bed plate 21 (Figs. 1, 3, 4 and 8) supports a plurality of relatively spaced engraving units, each of which includes an upright standard 18, the foot of which is bolted to the upper face of the table. Each standard has a vertical front face or cheek, near the upper end of which is fastened a bracket 17, the base of which extends beyond one edge of the standard.

Each bracket 17 includes a vertical web 23 (Fig. 8) projecting forwardly from the base. The upper and lower ends of the web are extended to form arms 42 terminating at their outer offset ends in split collars 15, 16, (Fig. 5) which firmly clamp opposed pintles 13, 14 adjustably inserted therein to support a work carriage 12 so that it may swing towards and from the cutting tools under control of the master plate and tracer, as hereinafter explained.

Work carrier

The work, as for instance, type wheel blanks 10 and 11 (Figs. 3–6), as herein shown, is removably mounted in a manner soon to be explained, on the swinging carriage. Eyes 22 projecting from one side of the work carriage, fit over the pintles 13 and 14 adjustably clamped in the split collars 15 and 16, respectively, of the bracket 17 by bolts 19 and 20, to provide an adjustment for the pintles, and the eyes 22 may enclose ball bearings (Fig. 5) engaged by the pintles. By shifting the pintles 13 and 14 in their split collars 15 and 16, the carriage 12 and the work 10, 11 supported thereby, is raised or lowered to permit the work to be centered vertically relatively to the cutters.

A trough-shaped supporting arm 24 (Figs. 3, 5, 6 and 8) projecting from and forming a part of the lower free end of the swinging work carrier 12, and lying in substantially the same vertical plane therewith, terminates in an offset bearing 26 enclosing bushings 27 (Fig. 6) in which is journaled a work mandrel 25, arranged parallel with the supporting arm.

The work mandrel 25 extends beyond the opposite ends of the bearing 26, the inner end of the mandrel overhanging the supporting arm 24, the trough of which forms an oil well. The work pieces to be engraved, as the type wheels 11, for example, are slipped onto the inner end of the mandrel 25 and slid along until they abut a spacing collar 31, against which they are clamped by a knurled finger nut 32 screwed on the threaded inner end of the mandrel.

The outer end of the work mandrel 25 is shouldered and threaded to carry an indexing wheel 28 held thereon by a nut 29, having a knurled periphery for manually rotating the entire mandrel and the work carried thereon. A circular flange 30 (Fig. 6) fast on the mandrel at the inner end of the bearing 26, together with the index wheel 28 on the outer end of the mandrel, hold the mandrel against longitudinal movement.

During the operation of engraving the characters on the type wheel blanks, or other work, the work pieces 11 and the work mandrel 25 should be held against rotation. A spring-pressed aligning detent 33 fast on one end of a short shaft 34 (Figs. 5 and 7) rotatably supported in the offset end of the supporting arm 24 and in a lug 35 depending from the bearing 26, is adapted to engage the notches cut between the characters formed on the blanks 11 to hold the work pieces against rotation. A lever 36 (Fig. 7) fast on the shaft 34 may be grasped by the operator to rock the shaft 34 and disengage the detent 33 from the work when it is desired to rotate the work mandrel to present the succeeding blank space to the cutter.

To rotate the work spindle 25, the operator rocks the lever 36 clockwise with one hand, as viewed in Fig. 7, to disengage the detent 33 from the work pieces 11, and free the work mandrel and index wheel 28 for rotation in either direction, which mandrel may then be turned by the knurled nut 29. After the desired surface on the type wheel or work 11 has been presented to the cutter, the operator releases the lever 36, whereupon the spring 37 (Figs. 5 and 7) attached thereto, rocks the lever 36 and shaft 34 counter-clockwise to reengage the detent 33 with the work. An index pointer 38 (Fig. 5) on the bearing 26 cooperates with the graduated indexing wheel 28 to facilitate adjustment of the work surface relatively to the cutter.

A bearing 39 (Figs. 3 and 5) formed along the upper edge of the swinging work carrier 12, encloses an upper mandrel (not shown, but similar to and parallel with the lower mandrel 25).

The upper work-supporting mandrel projects beyond the opposite ends of the bearing 39, the forward end of the mandrel supporting the work as the type wheels 10, held in place against a spacing collar 46 by a knurled finger nut 45 screwed on the outer threaded end of the upper work mandrel. The work pieces 10 lie in vertical alinement with, and are spaced above the work 11. A spring-pressed aligning detent 47 (Figs. 4 and 5) fast on a shaft 48 journaled in lugs 49 and 50 projecting upwardly from the bearing 39, co-operates with notches in the work 10 to hold it and the mandrel against rotation during the engraving operation. An indexing wheel 51 is secured to the left-hand end (Fig. 5) of the upper mandrel by a knurled nut 52 which may be grasped by the operator to turn the mandrel and the work 10, in the same manner as the lower mandrel 25 is rotated to index the work 11. A lever 57 secured to the aligning detent shaft 48 enables the operator to control the aligning detent 47.

The swinging work carriage 12 (Figs. 3, 5 and 8) is normally fast to a carriage-operating vibratory finger 53 (Figs. 5, 8 and 9), hinged at one end on a hinge pin 58 supported in lugs 54 and 55 projecting from the pivoted sides of the work carriage 12. The vibratory finger 53 is oscillated under control of a master character, in a manner hereinafter to be described, to swing the work carriage and the work towards and away from the cutters and thus vary the depth of cut.

The vibratory finger 53 lies substantially parallel with and alongside the inner face of the work carriage 12, to which it is releasably secured intermediate its ends, by a latch 61, rotatably mounted in a tubular adjusting screw 67 extending outwardly at right angles to the swinging carriage 12 and threaded at its inner end through the free edge of the swinging carriage.

The inner end of the rotatable latch 61 passes through a slot 62 (Fig. 9) in the free end of the vibratory finger 53, and carries a cross-head 60 adapted, when the latch 61 is partially rotated in one direction, to lie across the slot 62 and secure the swinging work carrier 12 to the vibratory finger.

A handle 63 fast on the outer end of the latch rod 61 enables the operator to conveniently turn the latch, which turning movement is limited by a pin 64 projecting from the latch and operating in a recess 65 of a collar 66 screwed onto the outer end of the tubular latch adjusting screw 67, and held in place thereon by a set screw 68. The tubular latch adjusting screw 67 is screwed into a tapped hole in the work carriage 12 so that it projects therethrough and to the rear thereof to form an adjustable locating means for the carriage 12. A lock nut 74 holds the tubular latch adjusting screw 67 where adjusted. A spring 59 compressed between the shoulder of the handle 63 and the end of the tubular screw 67 holds the cross-head 60 of the latch against the inner face of the finger 53 to press the finger against the inner end of the tubular adjusting screw and compensate for any wear on the cross-head 60.

To swing the work carriage outwardly for the purpose of inspecting, or removing and replacing the work, the operator grasps the handle 63 and turns it 90 degrees in a counter-clockwise direction, in which position the cross-head 60 of the latch registers with the slot 62 (Fig. 9), whereupon the work carriage 12 and the work mandrels are free to be swung outwardly relatively to the finger 53.

To adjust the work carriage to locate the work 10 and 11 relative to the cutters 40 and 41 (Fig. 4) in setting up the job, the lock nut 74 is first loosened, after which the tubular adjusting screw 67 may be turned either clockwise to move the carriage outwardly away from the cutters 40 and 41, or counter-clockwise to move the carriage inwardly closer to the cutters. After the carriage has been properly located or adjusted with respect to the cutters 40 and 41, the lock nut 74 is tightened against the face of the carriage 12, thereby locking the tubular adjusting screw 67 where set.

The collar 66 is adjustable upon the adjusting screw 67, so that, after the position of said adjusting screw has been changed, the cross-head 60 of the latch 61 may be brought into the correct position to pass through the slot 62 in the carriage operating finger 63. To effect the adjustment of the collar 66, it is only necessary to back out the set screw 68, turn the collar and latch rod 61 to their correct positions, and then tighten the set screw. This adjusts the recess 65 in the end of the collar to proper relation with the horizontal slot 62 in the carriage operating finger 53.

*Swinging support for the cutting tools and tracer*

The central portion of the web 23 of the bracket 17, (Fig. 8) between the arms 42, is laterally extended in a direction opposite to that in which the arms 42 are offset, to form a supporting arm 43 lying parallel with and opposite to the base of the bracket. A chambered boss 44 is formed integrally with the outer end of the supporting arm 43 and extends outwardly at right angles thereto, the bracket 17 being extended and apertured as at 56 in alinement with the bore of the chambered boss 44. The opposite ends of a hollow trunnion shaft 130 are reduced in size and journaled in ball bearings 100 mounted in the aperture 56 in the base of the bracket and in the outer end of the chambered boss 44, respectively. Caps 560 and 440 close the outer ends of the aperture 56 and the chambered boss 44, respectively, and form abutments to hold the ball bearings in place.

A tubular column 111 arranged perpendicularly and passing upwardly between the arm 43 and the base of the bracket 17, carries a laterally projecting lug 110 (Figs. 2, 8 and 10) some distance below its upper end, which lug is transversely apertured to accommodate the hollow trunnion shaft 130, to which it is fastened in any convenient manner, as by swaging.

*Cutters*

The work carriage 12 (Figs. 3 and 4) oscillates in a horizontal plane to advance the work 10 and 11 towards and withdraw it from the cutters 40 and 41 in the process of engraving the desired character on the work, under the control of a master character plate, as hereinafter explained. As the work carriage 12 swings the work closer to or farther away from the cutter, more or less metal is cut away in forming the character. At the same time, the cutters shift laterally back and forth across the face of the work, and at the end of each lateral stroke, are fed vertically, which vertical travel occurs step-by-step so that the cutters are caused to traverse the entire surface of the work. Since both the upper and lower cutters 40 and 41 cooperating with the work 10 and 11 on the upper and lower mandrels, respectively, are exactly alike, only one of said cutters will be described in detail.

The cutting tools 40 and 41 with their individual driving motors are supported on the hollow column 111, as follows:

A vertically extending rail 88 (Figs. 2 and 3) is formed longitudinally of the swinging column 111 and just below the supporting lug 110, a similar rail 104, in alinement with the first-named rail 88, being provided on the upper end of the swinging column above the supporting lug 110.

Referring to the lower cutter mechanism, a cutter slide 90 (Figs. 2, 3, 4, 12 and 13) embraces the sides of the rail 88 and has a transversely extending circular casing 84 formed at the upper end thereof to constitute a support for a sleeve 81 in which the cutter mechanism is removably mounted.

The casing 84 is split at one end, as at 91, (Fig. 13), an ear 93 being formed adjacent the split end. A clamp screw 92 extends through the ear 93 and into the slide rest 90 to enable the cutter mechanism to be clamped firmly in place.

Ball bearings secured in the opposite ends of the sleeve 81 support a cutter spindle 76 passing through the sleeve, the outer end of which spindle carries a chuck 75 held in place thereon by a set screw 77, the chuck holding the point of the lower cutting tool 41 at a point opposite the work on the lower work mandrel 25, the cutter spindle extending at substantially right angles to the work-supporting mandrel. The opposite end of the sleeve 81 is flared, as at 83, to form a support for one end of a frame 82, for an electric motor. A flexible coupling 78 (Fig. 12) connects the cutter spindle 76 to the armature shaft 79 of the electric motor.

The spindle 76 with its cutter 41, the spindle sleeve 81, and the motor are removable as a unit in order to grind or sharpen the cutter point 41, after which the cutter unit may be replaced in the machine. This feature materially reduces the time required for grinding the cutter points and expedites the assembling of the cutter unit in the machine. Adjustable means is provided to facilitate the proper location of the unit cutter mechanism relatively to the work, when placing the unit in the machine. Such means includes a locating screw 94 (Figs. 12 and 13) held by a set screw 87 in its adjusted position in an internally-threaded boss 95 on the cutter slide 90. As the cutter spindle unit is replaced in the casing 84, the point of a stop nut 96 on the end of a screw 97 projecting from the motor frame 82 in line with the screw 94, contacts and is arrested by the locating screw 94 to insure the proper location of the cutter 41 with respect to the work. A lock nut 98 holds the screw 97 in its position in the motor frame 82. The location of the spindle sleeve 81 and the cutter 41 may be varied by adjusting the locating screw 94, and by adjusting the stop nut 96 on the screw 97. A lock nut 99 holds the stop nut 96 in its adjusted position. The locating screw 94 may be set to position the cutter 41 to cut a character of a certain depth and by varying the position of the screw 94, the depth of the engraving may be varied. The nut 96 may be moved toward the motor frame 82 as the cutter 41 is sharpened to compensate for the material ground from the cutter, and insure that the cutter shall be returned to the same operative position.

The upper cutting tool 40 (Fig. 4) is identically mounted on a spindle (not shown) carried by a sleeve (not shown) removably mounted in a casing 105 on a cutter slide 106, in the same manner as that just described for the cutter 41. The upper cutter 40 is also driven by an individual motor 107, the cutter and motor being removable as a unit from the casing 105 for the purpose of grinding or dressing the cutter. Similar locating and adjusting screws and nuts are provided to facilitate the reinsertion and proper location of the cutter unit when it is replaced in its casing, and to compensate for material ground off of the cutter in sharpening.

The provision of means to enable the cutting tools to be adjusted towards and from the work permits the engraving of various sized type wheels or other work.

The cutter slides 90 and 106 (Figs. 2, 4 and 12) are adapted to be slid vertically during the operation of the machine to move the cutters 40 and 41 up and down across the face of the work. Each slide is provided with a gib 112 (Fig. 13) to take up any looseness due to wear, and enable the slides to be manually adjusted to a close fit on the rails 88 and 104 (Fig. 2).

As one convenient means to effect vertical movement of the cutting tools simultaneously, relatively to the work, the following mechanism is resorted to. Each cutter slide 90 and 106 is provided with an opening 108 (Figs. 2 and 12) intermediate its ends which registers with a somewhat longer opening 109 formed through the rails 88 and 104 to communicate with the hollow interior of the swinging column 111.

Connecting blocks 119 extend through the openings 108 in the respective cutter slides 90 and 106, and through the registering openings 109 in the column, the flanged heads of the connecting blocks 119 resting against and being slotted to enable them to be bolted to their respective slides, as at 120 (Fig. 4). Lag screws 126 (Fig. 2) mounted in each connecting block 119 extend longitudinally thereof to secure its connecting block 119 to a follower 116 mounted on the threaded portions 114 and 115 of a lead screw 113 journaled in a bearing plate 199 (Figs. 2, 20 and 24) projecting across the hollow interior of the swinging column. A bracket 200 (Figs. 2, 20, 21, 24 and 25) bolted over an opening 216 formed in the swinging column 111, intermediate its ends, supports the bearing plate 199 which extends transversely across the column with its free end projecting through an opening 217 in the column opposite the opening 216. Thrust bearings 218 above and below the bearing plate 199 support the lead screw against bodily movement longitudinally and reduce the friction.

The followers 116 for the cutter slides 90 and 106, each include a body portion apertured to encircle the adjacent ends of pairs of alined thimble-skeins 117, 118 threaded internally to engage with the threads 114 and 115 on the lead screw 113.

Each thimble-skein is flanged intermediate its ends, as at 125, to form projections engageable by the heads of bolts 122, 123 mounted in the opposite ends of the body portions of the followers 116, which bolts connect the thimble-skeins with the body portions of the followers, and the body portions of the followers, in turn, are attached to their cutter slides 90 and 106 by the connecting blocks 119.

The bolts 122, 123 afford a convenient means to take up lost motion between the thimble-skeins 117, 118 and the lead screw 113, due to wear or other causes, and permit rotation of the skeins with the lead screw and relatively to the followers 116.

Adjusting screws 124 (Figs. 2, 3 and 4) mounted in lugs 121 on the cutter slides 90 and 106 are provided to adjust the slides 90 and 106 vertically with respect to the threads 114 and 115 on the lead screw 113, such adjustment being retained by the usual locking nuts on the adjusting screws.

The lead screw 113 (Fig. 2) reciprocates the cutter slides 90 and 106 vertically in the frame 111, to cause the cutters 40 and 41 to travel vertically across the face of the work, and is threaded opposite the slide 90 with a right hand thread 114, and opposite the slide 106 with a left hand thread 115, which threaded portions operate to shift the slides 90 and 106 in opposite directions towards or from each other upon rotation of the lead screw 113. The lead screw is turned alternately in opposite directions by mechanism operable by oscillating the swinging column 111, which oscillating mechanism will first be briefly referred to, and later fully set forth.

*Vertical feed mechanism in brief*

A tracer slide 133 (Figs. 2, 3, 4, and 14) is mounted to reciprocate up and down on a vertical rail 134 formed longitudinally of the swinging column 111 near its lower end.

The slide is equipped with a gib 135 (Fig. 14), between itself and the rail 134, to compensate for wear and maintain a snug fit.

Bolts 142 pass through elongated slots formed in the apron of the tracer slide 133, and through an elongated opening 143 in the lower end of the swinging column, and screw into a follower 139 surrounding the lead screw 113. A spacer block 138 is positioned between the inner face of the apron and the follower 139. Internally threaded thimble-skeins 140 similar to the thimble-skeins 117 and 118 associated with the cutter slides 90 and 106, are threaded on the lower threaded portion 141 of the lead screw, and carry circular flanges 72 engaged by the heads of bolts 71 screwed into the ends of the follower 139. The bolts 71 connect the follower 139 to the thimble-skeins 140 in the same manner and for the same purpose as explained in connection with the bolts 122, 123 for the cutter slides 90 and 106.

A sleeve 70 (Fig. 4) formed on and extending transversely across the tracer slide 133 encloses a bushing 132 (Fig. 14) in one end of which is slidingly mounted a tracer 131, the outer end of which tracer protrudes from the bushing and is equipped with a conical point 136 seated in the end of the tracer and held by a set screw.

*Transverse feed mechanism*

The protruding end of the tracer 131 extends through a vertically arranged slot 146 (Figs. 4 and 14) formed in a horizontally reciprocatory cross-head 147 slidably mounted in slotted guides 148, 149 (Figs. 4 and 16). The guides 148 are conveniently supported on the table 21, and the guides 149 are mounted on the upper overhanging arms of a master plate bracket 150, the foot of which is fastened to the table 21. Power to reciprocate the cross-head 147 is provided by a motor as hereinafter more fully explained.

The walls of the vertical slot 146 are preferably hardened, as indicated in Fig. 14, from which figure, as well as Figs. 3 and 4, it is evident that a horizontal reciprocatory movement of the cross-head 147 will rock the tracer 131 back and forth in a generally horizontal direction, and that the tracer, in turn, will rock the swinging column 111 with its trunnion shaft 130 (Fig. 8), in the bearings 100, to effect a pendulum-like oscillation of the swinging column through a constant arc of travel. And since the cutters 40 and 41 are mounted respectively below and above the axis of the trunnion shaft 130, they receive an arcuate movement laterally across the face of the work in a direction transverse to the vertical feed. This arcuate movement, in connection with the vertical feed, moves the cutters over the entire area of the work.

*Vertical feed mechanism in detail*

Rotation of the lead screw 113 in one direction feeds the cutter slides 90 and 106 towards each other and at the same time, feeds the tracer slide 133 upwardly over the face of the master plate 137. Rotation of the lead screw 113 in the opposite direction feeds the cutter slides away from each other and lowers the tracer slide 133.

The thread 141 on the lower end of the feed screw 113 is preferably a right-hand thread and the follower 139 and its thimble-skeins 140 cooperate therewith to reciprocate the tracer slide 133 and the tracer 131 vertically over the face of a master plate 137. The ratio of the pitch of the threads 114 and 115 controlling the vertical feed of the cutters 40 and 41 vertically over the work to the thread 141 controlling the feed of the tracer 131 vertically over the master plate, is approximately 12 to 1, or such that when the lead screw 113 rotates sufficiently to raise or lower the tracer slide 133 one inch, the cutter slides 90 and 106 will be raised and lowered one-twelfth of an inch.

A spiral wheel 201 (Fig. 2) keyed to the lead screw 113 at a point adjacent the bearing plate 199 and held by lock nuts against movement longitudinally of the lead screw, meshes with a spiral gear 202 turning in a slot in the bracket 200 and fast on a shaft 203 journaled in bearings in the bracket 200. A ratchet wheel 204 (Fig. 20) fast on the shaft 203, is rotated step by step in one direction or the other by one or the other of two opposed feed pawls 205 and 206 pivotally supported in the side walls of a slot 219 (Fig. 23) formed longitudinally of a vertically reciprocating pawl-actuating bar 207. Guides or projections 208 and 209 spaced apart on the bracket 200 are slotted to accommodate the pawl-actuating bar 207 which is held in place therein by the cap plates 210 and 211 secured to the outer ends of the guides 208 and 209, respectively. A ball bearing roller 212 (Figs. 3, 20 and 21) carried on a stud 213 projecting laterally from the lower end of the pawl-actuating bar 207, is guided between two pairs of adjustable cam rails 214 and 215 secured to the face of the standard 18 and arranged on converging angles.

Normally the pawl-actuating bar 207 lies in its neutral or vertical position, as shown, with the roller 212 seated at a point of convergence between the adjacent ends of the pairs of rails 214 and 215.

At each swinging movement or oscillation of the column 111 with its trunnion shaft 130, the pawl actuating bar 207 carried by the column causes its roller 212 to traverse the entire space between the outer ends of the oppositely inclined pairs of rails 214, 215 which are set at such an angle relatively to each other and to the axis of oscillation that the roller 212 in moving outwardly in either direction from the central position shown in Figs. 3 and 20, is cammed upwardly to force the pawl-actuating bar upwardly.

Assuming, as shown in Fig. 20, that the pawl 206 is in engagement with the ratchet wheel 204, the pawls will rotate the ratchet wheel, shaft 203 and spiral gear 202 (Fig. 2) in a counter-clockwise direction, and the gear 202, meshing with the spiral gear 201 on the lead screw 113, rotates this screw to feed the cutter slides and the cutters 40 and 41 towards each other.

A hand wheel 220 (Figs. 3, 4 and 21) fast on the outer end of the shaft 203, forms a convenient means for manually rotating the gears 202 and 201, and the lead screw 113, to shift the cutters vertically over the face of the work. Obviously, by adjusting the cam rails 214, 215 at various angles relatively to the horizontal, different extents of feeding movement may be given the cutters 40 and 41 and the tracer slide 131.

*Automatic stop mechanism for vertical feed*

When the cutters 40 and 41 arrive at either the top and the bottom, respectively, of the character being engraved, it is desired to reverse the vertical movement of the cutter slides 90 and 106, which carry the cutters.

As a convenient means to effect this result, the tails of the opposed feed pawls 205 and 206 are pivotally connected to the upper and lower ends, respectively, of a control link 222 (Figs. 3, 20 to 23) provided with a laterally extending stud 221 embraced by the forked outer end of an arm 223 fast on one end of a rod 224 journaled concentrically in and extending through the ratchet wheel shaft 203. The forward end of the rod 224 is bent to form a convenient handle 225. A spring 226 connected to the stud 221, holds the link 222 and the vertical feed pawls 205 and 206 in their upper positions, as shown in Fig. 20, with the pawl 206 engaging the ratchet wheel 204, or in their lower positions, wherein the pawl 205 engages the ratchet 204.

Automatic means is provided to shift the link 222 vertically to disengage either feed pawl from the ratchet wheel 204, to render the vertical reciprocation of the pawl-actuating bar 207 ineffective to rotate the ratchet 204 and the lead screw 113. To this end a vertically extending rod 227 projects upwardly from a bracket 228 secured to the tracer slide 133, and passes loosely through an ear 229 projecting from the link 222. As the pawl-actuating bar 207 receives its vertical reciprocating movement at each oscillation of the swinging column 111, the pawl 206 rotates the ratchet wheel 204, shaft 203, and spiral gear 202 in a counter-clockwise direction, as viewed in Fig. 20, and the spirial gear 202, in turn rotates the spiral wheel 201 (Fig. 2) and the lead screw 113 to lower the tracer slide 133 which carries the tracer 131 and the rod 227. As the tracer 131 approaches the bottom of the master character, a nut 230 on the stop rod 227 engages the ear 229 on the link 222 and moves the link downwardly, which rocks the pawls 205 and 206 counter-clockwise about their respective pivots, to disengage the pawl 206 from the ratchet wheel 204, whereupon, the vertical movement of the pawl-actuating bar 207 is ineffective to rotate the ratchet wheel 204. The cutters and the tracer having now traversed the entire vertical length of the character, the operator disengages the tracer from the cross-head 147, by adjusting a tracer throwout lever 190, (Figs. 1, 3, 10 and 11), in a manner later described, and removes the old master plates 137, inserts new ones and indexes the work. Then, by movement of the handle 225 the operator rocks the rod 224 and arm 223 clockwise to further lower the link 222 to engage the pawl 205 with the ratchet wheel. The tracer throwout lever 190 is now restored to the position shown in Fig. 11, whereupon the tracer 131 is reengaged with its cross-head and the operation continued.

It is obvious that upon downward movement of the pawl-actuating bar 207, the pawl 205, when in effective position, will rotate the ratchet wheel 204 in a clockwise direction to raise the tracer slide 133, which, as it approaches its upper limit of travel, brings a nut 231 on the stop rod 227 into contact with the link 222, to shift the latter upwardly and rock the pawls counter-clockwise about their pivots to their neutral positions. The stop nuts 230 and 231 are adjustable to control the extent of feed in each direction of the cutter slides 90, 106 and the tracer slide 133 before the feed is automatically thrown off. Lock nuts hold the stop nuts 230 and 231 in their adjusted positions.

Contour feed mechanism

As the cross-head 147 (Fig. 14) reciprocates the tracer 131 laterally across the face of the master character plate 137, the tracer slides back and forth axially in its bushing 132, due to the uneven surface contour of the master plate. This reciprocatory movement of the tracer 131 is transmitted to the work carriage 12 to move the work to and away from the cutters 40 and 41 in order to shape the character in the process of engravure. A desirable form of mechanism whereby the axial reciprocatory movement of the tracer 131 (Figs. 4 and 14) is transmitted to the work carriage 12 (Figs. 3, 5 and 8) will now be described.

A transmitting finger 171 (Fig. 14) is keyed to slide longitudinally on a tracer shaft 172, the upper end of which shaft is successively reduced to form a series of shoulders (Fig. 10).

An anti-friction bearing 184 (Fig. 10) held against an intermediate shoulder on the upper end of the tracer shaft 172, by a suitable lock nut, rests in a seat formed in the projecting ear 232 of a slotted cap plate 173 bolted to the outer face of the lug or enlargement 110 at the upper end of the swinging column 111, and supports the tracer shaft 172, the lower end of which shaft is confined in a pair of ears 174 (Figs. 2 and 4) projecting from the tracer slide 133 and embracing the transmitting finger 171 to cause the latter to travel vertically with the tracer slide 133 relatively to the tracer shaft 172 which has no vertical movement, but swings with the column 111. The free end of the transmitting finger 171 (Fig. 14) is adapted to be yieldingly held against the inner end of the tracer 131, and thereby communicate the axial reciprocatory movement of the tracer 131 to the tracer shaft 172. The anti-friction bearing 184 (Fig. 10) holds the hub of a segmental gear 177 (Figs. 8 and 10) against a shoulder on the tracer shaft 172. The transmitting finger 171 (Fig. 14) shifts freely up and down over the lower portion of the tracer shaft 172, which has a longitudinally extending keyway therein to accommodate the key 180 by which the transmitting finger 171 oscillates the tracer shaft. The end of a spring-pressed plunger 175 normally projects into an annular groove 181 in the inner end of the tracer 131 to prevent accidental displacement of the tracer when no master plate is in place in the holder or when the master plates are being removed and replaced. A pin 176 projects from the plunger 175 through an elongated slot in the transmitting finger 171 to enable the operator to withdraw the plunger from the annular groove 181 when it is desired to remove the tracer 131 from its bushing 132.

The segmental gear 177 (Figs. 8 and 10), keyed to a shouldered portion at the upper end of the tracer shaft 172, meshes with a segmental lever 178 pivoted on a vertical stud 179 carried by inwardly extending ears on the slotted cap plate 173, the outer end of the segmental lever 178 extending through a slot in the cap plate to engage the segmental gear 177, and the inner end 185 of the segmental lever extending through a slot in the lug 110 and through a slot 182 in the tubular trunnion shaft 130 supporting the swinging column 111, where it contacts one end of a push rod 186 slidable longitudinally in the tubular trunnion shaft 130 between the inner end 185 of the lever 178, and the free end 187 of the carriage-operating finger 53. A spring 188 presses a plunger 189 constantly against the opposite side of the free end 187 of the carriage-operating finger 53, and in consequence, forces the finger 53 into contact with the push rod 186 which transmits the pressure of the spring 188 to the lever 178, and through the segmental gear 177 and tracer shaft 172, the transmitting finger 171 is held against the inner end of the tracer 131 to maintain the outer end of the tracer constantly in contact with the design on the master plate 137.

It can be seen that the oscillating movement given the tracer shaft 172 by the tracer 131 (Fig. 14) as it traverses the face of the master character is transmitted by the segmental gear 177, segmental lever 178, and the pushrod 186 to the carriage-operating finger 53, and, since this finger is latched to the carriage 12, the carriage and the work mounted therein is rocked towards and from the cutters 40 and 41.

The spring 188 bears against a tensioning screw in the bearing retainer 440. Clockwise movement of the segmental gear 178, as viewed in Fig. 8, is limited by an adjusting screw 191 in the bracket 173 to limit the movement of the work towards the cutters. The rocking movement of the carriage and its work can be adjusted by turning the screw 191 in either direction.

From the above, it can be seen that, as the tracer 131 traverses the face of the master plate, it will, when it engages the high surfaces of the character, move the work 10 and 11 away from the cutters, and that as the tracer 131 passes onto the low surfaces of the master character, the spring 188, acting upon the work carriage 12, advances the work 10 and 11 closer to the cutters 40 and 41. The ratio of the reciprocatory movement of the tracer 131 to the resultant movement of the work to and away from the cutters 40 and 41 is approximately 3 to 1. That is, if the tracer 131, in shifting from a low relief surface to a high relief surface of the master plate, slides $\frac{3}{16}$ of an inch into its bushing 132, (Fig. 14), the work-supporting carriage 12 will move the work 10 and 11 a distance of $\frac{1}{16}$ of an inch away from the cutters 40 and 41, which results in engraving a similar character 1/16 of an inch high on the work.

To insure accurate cutting of the character on the work under the control of the master character, it is essential that the swinging column 111 travel in a plane exactly parallel to the face of the master plate 137. This is accomplished by means of a roller 196 (Fig. 4) mounted to rotate in a support 197 carried by the tracer slide 133. As the column 111 is moved back and forth by the cross-head 147, the roller 196 travels across a face plate 198 secured to the standard 18. This face plate may be adjusted so that it is exactly parallel with the master plate 137, and it can be seen that the column 111 on its oscillatory travel, traverses a plane parallel to the face plate 198 and, consequently, parallel to the master plate 137. Reciprocation of the tracer 131 in the bushing 132 (Fig. 14) as it travels over the uneven surface of the design of the master plate, does not affect the oscillatory travel of the column 111. Adjusting screws 270 (Fig. 8) mounted in the upper end of the standard 18 bears against the inner face of the bracket 17, other adjusting screws 270 (Fig. 4) being located in the lower end of the standard and bearing against the guide plate 198, to enable a very fine and accurate adjustment of the cutters and work, to be obtained, and to enable the guide plate to be brought into parallelism with the master plate.

In removing or changing master plates, it is desirable to withdraw the tracer 131 from contact with the face of the master plate. To accomplish this, a manual throwout lever 190 (Figs. 3, 10 and 11) fits over the reduced upper end of the tracer shaft 172 and rests on a latch plate 192 secured to the cap plate 173. The throwout lever 190 is held in either of two positions by a spring-pressed latch 193, the nose of which cooperates with notches 194 and 195 formed on the edge of the latch plate 192.

Movement of the lever 190 is adapted to engage the side of a keyway 183 (Fig. 11), formed in the hub of the lever, with the key 271 in the tracer shaft 172. The keyway in the lever 190 is purposely made larger than the key to enable the tracer shaft 172 to oscillate freely during the operation of the machine without obstruction from the latched lever 190.

When it is desired to withdraw the tracer 131 from contact with the face of the master plate 137, the operator grasps the lever 190, disengages the latch 193 from the notch 194 and swings the lever forwardly until the latch enters the notch 195. This rocks the tracer shaft 172 clockwise, as viewed in Fig. 14, and through the plunger 175 in the transmitting finger 171, withdraws the tracer from contact with the master plate 137 and also from its slot 146 in the cross-head 147, thereby disconnecting the swinging column 111 from the drive mechanism and permitting the column to come to rest.

Obviously, the tracer shaft 172, when manually rocked clockwise, in Fig. 8, will rock the segment lever 178 counter-clockwise and force its free end 185 against the push rod 186 which will thrust the carriage-vibrating finger 53 clockwise against the tension of the spring 188 and thus rock the work carriage 12 and the work carried thereby, away from the cutters 40 and 41.

To restore the tracer 131 to its operative position, the lever 190 is shifted to the position shown in Fig. 11, whereupon the spring 188, through the push rod 186 and segmental lever 178 rocks the tracer shaft 172 counter-clockwise (Fig. 14) to restore the carriage and reengage the tracer 131 with its slot 146 in the cross-head 147 and with the master plate 137.

Master plate holder

The master plate bracket 150, (Figs. 1, 14, 15 and 16), hereinbefore referred to, comprises a foot resting upon and bolted to the table 21, a perpendicular face plate extending upwardly from the rear edge of the foot, and bracing knees connecting the foot and face plate. The face plate is longitudinally slotted, as at 253 (Figs. 14 and 15), the rear edges of the slot being chamfered, as shown in Fig. 16, and the forward upper edge of the slot being shouldered as at 252 to form a seat for the upper edge of the master plate 137, as hereinafter explained.

The master plate holder 240 is located in front of the face plate of the bracket 150, the lower edge of the holders having eyes formed therein through which extends a pintle 241 mounted in the knees of the bracket near the foot thereof, to enable the holder 240 to be rocked towards and from the slotted face plate.

The holder is longitudinally slotted as at 238, and its rear face provided with a longitudinally extending shoulder 251 (Fig. 16) to form a seat for the lower edges of the master plates 137, the upper edges of which lie beneath the shoulder 252 just above the longitudinal slot 253 in the face plate of the bracket 150, when the holder 240 is in its effective position wherein it presents the master plates to the tracer 131.

A threaded clamping rod 244 is journaled at its opposite ends in ribs 239 formed on the forward face of the slotted holder 240, the clamping rod lying in registry with the slot 238 in the holder and carrying a clamping block 246 projecting through and shiftable along the slot 238.

One end of the clamping rod 244 is extended beyond the side of the bracket 150 through a slot therein and is equipped with a knob 245 which, when turned in one direction or the other, shifts the clamping block 246 in one direction or the other along the slot 253 in the holder 240 to clamp the master plate 137 in the holder or to release the master plate.

A removable spacing plate 247 (Fig. 14), of proper width is interposed, in the slot 253, between the master plate 137 and an abutment bar 248 secured to the right hand end of the holder 240 transversely of the slot 253 for the purpose of properly locating the master plate relatively to the tracer point 131. A collar 249 near one end of the clamping rod 244 and a nut 250 and washer on the opposite end of said clamping rod, prevents longitudinal movement thereof in the holder 240.

A handle 242 pivoted to the upper free end of the frame 240 is adapted to engage behind a spring latch 243 (Fig. 17) secured near the upper edge of the bracket 150 to latch the holder 240 in its operative position.

To replace the master character plate 137, the handle 242 (Fig. 15) is rocked counter-clockwise until free of the latch 243, after which the holder 240 is swung outwardly. The clamping rod 244 is then turned by the knob 245 to withdraw the block 246 from the master plate 137, which may now be removed from the frame 240. The desired master plates are then placed against the shoulder 251 on the holder 240 and centered longitudinally of the slot 253 by a spacing plate or plates 247. The clamping block 246 is then tightened against the master plate, the holder 240 swung to its vertical position and the handle 242 engaged with the latch 243.

To compensate for wear or looseness, the latch 243 is made substantially as shown in Fig. 17 with an adjusting screw to adjust the tension thereof when the holder 240 is latched in its vertical position. The upper edges of the master plates rest against the shoulder 252 at the upper edge of the slot 253 in the bracket 150. Thus the master plates are held against the possibility of vertical movement under the influence of the tracer 131 as it traverses the face of the master character.

While only two master plates 137 are shown in position in the holder 240 in Figs. 14 and 15, and only two work pieces 10 and 11 are shown on each of the work mandrels 25 (Fig. 6), it is to be understood that several master characters may be placed in operative position in the holder 240, and that several work pieces on each mandrel may be engraved at one time. It is to be further understood that when several work pieces are to be engraved at a single operation, it is not necessary that each be engraved with the same character, but that any combination of characters may be engraved at the same time. The corresponding work pieces 10 and 11, however, are engraved with the same characters, that is, the left hand type wheel 10 (Fig. 5) and the right hand type wheel 11 are simultaneously engraved under the control of the same master character plate 137, and therefore, these two type wheels receive the same engraving. Likewise the right hand type wheel 10 and the left hand type wheel 11 receive the same engraving at the same time under control of the same master plate 137.

*Motor drive*

The cross-head 147 (Fig. 19) has two slots 146 therein, to adapt it to actuate the tracers 131 for the two right hand units. (See Fig. 1). Another cross-head 151 (Fig. 19) just like the cross-head 147 and located in alinement therewith, has slots 152 formed therein to accommodate the tracers for the two left hand units (Fig. 1) of the machine.

As previously mentioned, the cross-heads 147 and 151 are actuated by a pneumatic motor 145 (Figs. 18 and 19). The motor is mounted on a bracket 153 supported on the table 21 of the machine at a point between the two alined cross-heads 147 and 151, and when supplied with compressed air through a pipe 154, a reversing valve 155 and pipes 156, the motor will rotate a shaft 157 alternately in opposite directions under control of the reversing valve. The shaft 157 is coupled to a shaft 158 supported in bearings 159 in the motor frame. A pinion (see Fig. 19) fast on the shaft 158 meshes with a pair of parallel opposed racks, 165 below and 166 above, attached to the cross-heads 147 and 151, respectively. The rack 166 carries two adjustable reversing brackets 167 and 168 located on opposite sides of the motor and having laterally projecting studs 169 and 170, respectively, adapted to operate the reversing valve 155 when the rack 166 reaches either end of its reciprocatory path.

As the shaft 158 rotates in a counter-clockwise direction, (Fig. 19), it drives the rack 165 and its cross-head 147 towards the right, and at the same time, drives the rack 166 and its cross-head 151 towards the left until the stud 169 on the bracket 167 contacts with and operates the reversing valve 155, whereupon the pneumatic motor is reversed to rotate the shaft 158 in clockwise direction, thereby driving the rack 165 and cross-head 147 towards the left and the rack 166 and cross-head 151 towards the right until the stud 170 on the bracket 168 contacts the reversing valve to again reverse the motor. The lower ends of the adjustable brackets 167 and 168 are recessed on one side to embrace the rack 166, and are clamped thereto by means of set screws. Each of the brackets is provided with a lug which fits between two teeth on the rack to hold the brackets against movement on the rack. The brackets 167, 168 are adjustable relatively to the rack 166, to vary the extent of travel of the cross-heads 147 and 151, and thus control the extent of oscillation of the swinging column 111 and the transverse travel of the tracer 131 over the master plate 137, and of the cutting tools 40 and 41 across the work.

As stated above, the tracers 131 project through vertical slots 146 and 152 in the cross-heads 147 and 151 (Figs. 4 and 19) so that the lateral movement of the cross-heads 147 and 151 is transmitted by means of the tracer 131 to all of the swinging columns 111, to impart a constant regular oscillatory movement to the columns.

*Modified tracer and cutter feed*

Figs. 24 to 30, inclusive, illustrate a modified form of mechanism for feeding the tracer and the cutters vertically in the machine.

When engraving work having a considerable breadth, as wide type wheels, the cross-heads 147 and 151 impart a full swing to the columns 111, and consequently to the feed bars 207, which in turn, feed the tracers 131 and the cutters 40 and 41, the proper distance vertically over the face of the master plates and of the work. When engraving narrow work, however, it is a decided waste of time to permit the tracer and cutters to continue their maximum swing beyond the face of the work. For this reason when narrower work is being operated upon, as narrow type wheels, or work of any particular width is to be engraved, the oscillatory travel of the columns 111 may be limited to the width of the particular work in the machine. This is effected by properly adjusting the pneumatic motor reversing brackets 167 and 168 on the rack 166 (Fig. 19) so that the reversing movements of the cross-heads 147 and 151 in opposite directions occur as the tracers clear the master character, and as the cutters clear the work. When the travel of the roller 212 (Fig. 20) on the pawl-actuating bar 207, outwardly from its median position is thus limited, it is obvious that the vertical movement of the pawl-actuating bar 207 is reduced, which results in limiting the vertical feeds of the cutters 40 and 41 and of the tracers 131. It is possible, therefore, in engraving on narrow work, that the oscillatory travel of the swinging columns 111 to move the cutters laterally across the face of the work, will be insufficient to impart a throw to the pawl-actuating feed bar 207 traveling with the column, sufficient to effect the vertical feed of the cutters and tracers.

To overcome this possibility, a pneumatic feed, independent of the mechanical feed heretofore explained. (Figs. 24 to 30), has been devised and will now be described.

A double-toothed feed pawl 255 (Figs. 24, 25, 26 and 27) pivoted on one arm of a bell crank 256, which it itself journaled on the hollow shaft 203, is adapted to engage and rotate the ratchet wheel 204 and the shaft 203 to feed the cutter-carrying slides 90 and 106 with their cutters, and the tracer-carrying slide 133 and tracer 131. A link 257 connects the remaining arm of the bell crank 256 with a piston link 258. A pivoted hanger 259 supports these links at their point of connection. The piston link 258 projects through a slot in the wall of a cylinder 260 and into a slot formed in the side of a piston 261 to which said link 258 is pivoted.

The pneumatic cylinder 260 may be conveniently secured to the rear end of the bearing plate 199 projecting across the hollow column 111, as shown in Figs. 20 and 24. Compressed air admitted into the opposite ends of the cylinder 260 through the ports 262 and 263 (Fig. 24) under control of a reversing valve 264 (Fig. 30), reciprocates the piston 261 in either direction from its central position in which it is shown in Fig. 26. Upon admission of compressed air into the cylinder 260 through either of the intake ports 262 or 263, the piston 261 is shifted to one end or the other of the cylinder 260, and through the links 258 and 257 rocks the bell crank lever 256 clockwise. If the lower tooth of the feed pawl 255 is in engagement with the ratchet wheel 204, the ratchet and the shaft 203 will be turned in clockwise direction. When compressed air is admitted to the opposite intake port, the piston 261 moves quickly to the opposite end of the cylinder 260.

As the piston travels towards the center of the cylinder, it moves the links 258 and 257 to rock the bell crank 256 counter-clockwise, which draws the lower tooth of the pawl 255 idly over the notches in the ratchet wheel 204. However, as soon as the piston passes the center of the cylinder and travels toward the opposite end of the cylinder, it again draws the links 258 and 257 to rock the bell crank 256 clockwise, which again advances the ratchet wheel 204, and consequently the screw 113 to feed the cutters 40 and 41, and the tracer 131 vertically relatively to the faces of the work 10, 11, and of the master plate 137, respectively.

To control the admission of compressed air to the intake ports 262 and 263, the valve 264, (Fig. 30), exactly like the valve 155 which controls the air supply to the pneumatic motor described above, acts as a supply valve and an exhaust valve for the cylinder 260, and is of a type well known in the art, for which reason no detailed description thereof is included in this specification. The valve 264 is operated by studs 265 and 266 on the brackets 167 and 168, respectively, on the rack 166. It can be seen, therefore, that the cutters and the tracer are fed the same distance at each end of each movement of the crosshead 147, which, of course, is the end of each outward swing of the column 111 regardless of the length of travel of said column. Fig. 27 diagrammatically illustrates the travel of the tracer 131 over the face of the master plate. In this figure, the slightly arcuate lateral lines indicate the travel imparted by the swing of the column 111 to the tools and tracer, and the short vertical lines at the alternate ends of the lateral lines represent the downward feed. The tools and tracer pursue the same path in feeding upwardly.

When the tracer 131 has reached a point at the bottom or top of the master character, it is desired to stop the feed of the cutters and the tracer. This is effected by swinging the double feed pawl 255 (Figs. 24 and 26) so that both teeth thereof are disengaged from the ratchet wheel 204. A tail 267 on the pawl 255 is looped to surround the fed reversing rod 227, previously mentioned, carried by the tracer slide 133. As the slide 133, together with the rod 227, is moved upwardly, the nut 231 thereon approaches the tail 267 of the feed pawl 255, and when the tracer arrives at the uper limit of the master character, the nut 231 contacts the tail 267 and rocks the pawl 25 counter-clockwise to its neutral position wherein neither of its teeth are engaged with the ratchet wheel, so that the piston 261 reciprocating in its cylinder 260, is ineffective to rotate the ratchet wheel 204 in either direction. A plunger 268, one end of which is pivotally supported on an elongated stud 269 projecting laterally from the end of the tail 267, is slidable in a block 275, pivotally supported on the end of the longer arm of the bell crank 256. A spring 276 compressed between a shoulder on the plunger 268 and the block 275, holds the pawl 255 in either of its operative positions.

A manual reversing means is provided for the pneumatic feed, which reversing means comprises two radially extending rods 277 and 278 (Figs. 24, 25, 26 and 28) fast in a hub 279 fixed on one end of a bar 280, extending through the center of the hollow shaft 203. The opposite end of the bar 280 is bent at a convenient angle to form a handle 281 adapted to be grasped by the operator to rock the bar 280 in either direction. If rocked in counter-clockwise direction, as viewed in Figs. 24 and 26, the rod 278 strikes the elongated stud 269, projecting laterally from the tail 267 of the pawl 255 across the path of travel of the rods 277 and 278, thereby rocking the pawl 255 counter-clockwise to disengage the lower tooth thereof from the ratchet wheel 204, and to engage the upper tooth therewith to reverse the direction of vertical feed for the cutters and the tracer.

The extent of the feed, or the number of notches through which the ratchet wheel 204 advances at each feed stroke of the piston 261, may be regulated by two set screws 282 and 283, (Fig. 26), one projecting into the cylinder 260 from each end. These screws may be adjusted to limit the length of the stroke of the piston 261, and are held in their proper positions by lock nuts. The locations of the reversing nuts 230 and 231 (Fig. 24) on the reversing bar 227 determines the extent of vertical feed in either direction of the cutters and tracer.

*Operation*

Briefly, the operation of the engraving machine described above is as follows:

The operator having determined the size of type wheels or other work 10 and 11 to be engraved, and the characters to be engraved thereon, first selects the master plate 137 containing the desired character. The master plate holder 240 (Fig. 15) is then rocked outwardly and the master plate 137 inserted therein, the number of plates inserted being determined by the number of type wheels or other work units which it is desired to engrave. One blank work unit is then placed on each of the work mandrels for each master plate inserted in the holder 240, after which the work carriage 12 is latched to the carriage-operating finger 53.

By opening a valve (not shown) in the air line 154, (Fig. 18), compressed air is admitted to the motor 145, which immediately actuates the crossheads 147 and 151, to swing the columns 111 through their regular oscillations. Admission of compressed air to the motor also supplies the pneumatic feed mechanism with compressed air.

The tracer 131 may be started either at the top or bottom of the master character. If it is started at the top, the cutters 40, 41 will start at their closest points to the tubular trunnion shaft 130 which is the pivot for the column 111, the upper cutter being fed upwardly, and the lower cutter downwardly over the faces of the respective type wheels or other work pieces. If the tracer 131 commences its operation at the bottom of the master character, the upper and lower cutters 40, 41 will start at the top and bottom, respectively, of their associated type wheels or work pieces, and feed vertically towards the trunnion shaft 130 across the face of the type wheels, at the same time, swinging transversely across the faces of their associated type wheels or work as the tracer traverses the master character.

When the cutters have been moved once vertically across the faces of the work, the feeding device is automatically disabled as described above. However, the column 111 continues to swing. By moving the tracer throwout lever 190 forwardly, the tracer 131 is withdrawn from its slot 146 in its cross-head 147 and the corresponding column 111 comes to rest without disturbing the operation of the remaining engraving units. Rocking the tracer throwout lever 190 towards the front of the machine, also shifts the work carriage 12 outwardly far enough to cause the work to clear their respective cutters 40 and 41.

The work mandrels 25 and the work units 10 and 11 are now indexed or rotated to present the next blank space on each work unit to the respective cutter. The master plates 137 are removed and others inserted to control the engraving of the next character or characters on the work. The reversing lever 225 is now moved to engage the feed pawl 205 or 206 with the feed ratchet 204 so that the vertical movement of the cutters and the tracer 131 will be in the reverse direction from that of the last operation.

The work having been indexed and the master plates changed, the throwout lever 190 is shifted to the rear, which permits the tracer 131 to enter its slot 146 in the cross-head 147 and contact the master character plate 137. This forward movement of the tracer, through the tracer shaft 172 and the mechanism illustrated in Fig. 8, and described in detail above, swings the work carriage 12 to engage the work with the respective cutters 40, 41.

The same procedure applies to all four of the units comprising the machine as illustrated in Fig. 1.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described; the combination with a swinging supporting means; a cutter slide carried by said supporting means to shift relatively thereto; and a cutter mounted on the cutter slide; of a master character plate; a pivoted work carriage; a tracer shiftably mounted on the supporting means and adapted to move the work carriage toward and away from the cutter; and means to swing the supporting means with the cutter and tracer to shift the tracer laterally across the master plate and the cutter across the work.

2. In a machine of the class described; the combination with a swinging support; and a cutter and a tracer carried thereby; of a stationary master plate; a pivoted work carriage; connections to enable the tracer to shift the work carriage and the work away from the cutter under the control of the master plate; and a spring to shift the work carriage and the work towards the cutter under the control of the master plate.

3. In a machine of the class described; the combination with a swinging support; a tracer carried by said swinging support to reciprocate relatively thereto; a stationary master plate; means to shift the tracer across the master plate; a pivotally supported work carriage; and connections whereby reciprocatory movement of the tracer imparted thereto as it passes over the contour of the master plate is imparted to the work carriage.

4. In a machine of the class described; the combination with a standard; and a swinging support carried by said standard; of a work carriage pivotally supported on said standard; cutters mounted to slide on said swinging support; a reciprocatory tracer also mounted to slide on said swinging support; a master plate with which the tracer contacts; means to shift the cutters and the tracer on the swinging support; means to rock said swinging support; and means connecting the tracer and the work carriage whereby the reciprocation of the tracer due to its travel over the contour of the master character is imparted to said work carriage to control the position of the work relatively to the cutters.

5. In a machine of the class described; the combination with a stationary master plate; a tracer; automatic means to shift said tracer in a path of travel across the master plate; and automatic means for feeding said tracer in a path at substantial right angles to the first-named path, across said master plate; of a pivoted work carriage; a shift adapted to be oscillated by the tracer as said tracer passes over the contour of said master plate; and means whereby the oscillation of the shaft is transmitted to the work carriage.

6. In a machine of the class described; the combination with a stationary master plate; a swinging support; a tracer carried by said swinging support; means to cause said tracer to traverse the master plate; a shaft oscillated by said tracer; a pivoted work carriage; an operating finger pivoted on said carriage; means to transmit the movement of said shaft to the operating finger; and means to releasably latch the work carriage to said operating finger so that said carriage is vibrated thereby.

7. In a machine of the class described; the combination with a master plate; a shaft; a tracer in contact with the master plate; means to cause the tracer to traverse the surface of the master plate; of means between the tracer and the shaft to cause the tracer to oscillate said shaft; a pivoted work carriage; an operating finger pivoted on said carriage; means to releasably latch the carriage to the operating finger; a spring urging the finger in one direction; a segment on said shaft; a segmental lever meshing with said segment; and a rod between the segmental lever and said operating finger to transmit the movement of the shaft to the operating finger.

8. In a machine of the class described; the combination with a swinging support; of means to rock the support, including a cross-head; a tracer carried by said swinging support; means to cause the tracer to travel relatively to the support; the cross-head having an opening therein to accommodate the tracer and form an operative connection between said cross-head and the swinging support.

9. In a machine of the class described; the combination with a swinging support; and a tracer carried thereby; of a cross-head for operating said support, and having a slot to accommodate the tracer; a spring to hold the tracer in operative relation with said slot; and manual means to withdraw the tracer from the slot to disconnect the swinging support from the cross-head.

10. In a machine of the class described; the combination with a swinging support; a master plate; and a tracer carried by said support to cooperate with said master plate; of a cross-head having a slot through which the tracer extends to contact the master plate; and means to reciprocate the cross-head to cause the tracer to travel across the face of said master plate and to oscillate the swinging support.

11. In a machine of the class described; the combination with a master plate; a swinging support; and a tracer carried by said support; of a cross-head releasably engaged by the tracer; automatic means to reciprocate said cross-head to swing the support and shift the tracer in an arcuate path across the master plate; and automatic means to advance the tracer across the master plate at right angles to its arcuate travel.

12. In a machine of the class described; the combination with a master plate; a swinging support; of a tracer carried by said support to reciprocate relatively thereto; cutters carried by said support; a pivoted work carriage; a cross-head releasably engaged by the tracer to swing the support and shift the tracer in an arcuate path across the master plate, and to shift the cutters in an arcuate path across the work; automatic means to operate said cross-head; automatic means to shift the tracer across the master plate at right angles to the arcuate movement, and to feed the cutters across the work at right angles to their arcuate movement; and means to transmit reciprocatory movement of the tracer, due to said tracer following the contour of the master plate, to the work carriage to move the work correspondingly with respect to the cutters.

13. In a machine of the class described; the combination of a swinging support; slides carried by said support; a feed screw cooperating with all of said slides; means to oscillate the support; and means actuated by said support when oscillated, to rotate the feed screw and cause the slides to travel longitudinally of said support.

14. In a machine of the class described; the combination of a swinging support; a tracer mounted in the support; tracer and cutter slides carried by said support; a lead screw to impart motion to the slides; and means to rock said support; of a pawl-actuating bar slidably mounted on the support; stationary cams to reciprocate said pawl-actuating bar one at each outward swing of the support from its median position; a shaft carried by the support and having a gear thereon meshing with a gear on said lead screw; a ratchet wheel on said shaft; and pawls connected to the pawl-actuating bar and cooperating with said ratchet, to rotate the shaft and lead screw and cause the slides to traverse the swinging support.

15. In a machine of the class described; the combination with a swinging support; tracer and cutter slides carried by said support; and means to rock said support; of means operated by the swinging support to feed said slides longitudinally of said support; automatic means to render the feeding means ineffective; and manual means to reverse the feeding means so that said feeding means will feed said slides reversely.

16. In a machine of the class described; the combination with a swinging support; tracer and cutter slides carried by said support; and automatic means to rock said support through a constant arc; of means operated by the swinging support to feed said slides longitudinally of the support; automatic means to disable the feeding means; and manual means to render the feeding means effective to feed the slides reversely.

17. In a machine of the class described; the combination with a swinging support; slides carried by said support; a lead screw for said slides; and a ratchet to rotate said lead screw to feed the slides along the support; of a reciprocating pawl-actuating bar carried by said support; pawls pivoted on said bar; a link connecting said pawls; and automatic means to control the link and shift the pawls to their neutral, ineffective positions.

18. In a machine of the class described; the combination with a swinging support; means to rock said support; tracer and cutter slides carried by said support; and means, including a ratchet wheel to cause the slides to travel relatively to the support; of a pawl-actuating bar carried by the support, means combined with the rocking support adapted to reciprocate the pawl-actuating bar due to the rocking of the support; pawls carried by said pawl-actuating bar, one of said pawls being in coactive relation with the ratchet; a link connecting said pawls; an ear on said link; a control rod carried by one of said slides and passing through an opening in said ear; stops on said control rod to contact the ear in said link when said one slide has been moved a predetermined distance, and shift said link to disengage the pawl from said ratchet, to render the pawl-actuating bar ineffective to operate the slides; and manual means to shift either of said pawls into cooperative relation with the ratchet.

19. In a machine of the class described; the combination with a swinging support; means to rock said support; tracer and cutter slides carried by said support; and a lead screw cooperating with said slides; of means operated by the support as it swings to rotate said lead screw to feed said slides; means carried by one of said slides to render said feed means ineffective; manual means to render said feed means effective; and means to manually rotate the lead screw to feed the slides.

20. In a machine of the class described; the combination with a swinging frame, tracer and cutter slides carried by said frame; and a cross-head operatively connected to the support to swing the latter; of a pawl-actuating bar slidable longitudinally of and adatped to swing with said support to feed the slides; and cam plates with which said pawl actuating bar coacts, to reciprocate the pawl-actuating bar at each outward swing of the support.

21. In a machine of the class described, the combination with a swinging support pivoted intermediate its ends; cutters shiftably mounted on the support above and below the pivot point thereof; means to sway the support back and forth; a tracer slidable relatively to the support; a master plate traversed by the tracer; means to feed the cutters and tracer step by step in either direction; a work carriage on which the work is mounted; and means controlled by the slidable tracer under the influence of the master plate to move the work carriage back and forth relatively to the cutters.

22. In a machine of the class described, the combination with a swinging support pivoted intermediate its ends; cutters shiftably mounted on the support above and below the pivot point thereof; means to sway the support back and forth; a traced slidable relatively to the support; a master plate traversed by the tracer; means to feed the cutters and tracer step by step in either direction; and means opposed to the master plate to confine the path of travel of the swinging support to a constant plane.

23. In a machine of the class described, the combination with a swinging support pivoted intermediate its ends; cutters shiftably mounted on the support above and below the pivot point thereof; means to sway the support back and forth; a tracer slidable relatively to the support; a master plate traversed by the tracer; means to feed the cutters and tracer step by step in either direction; and unyielding means to oppose the thrust of the tracer as it traverses the master plate, and to maintain the swinging support in a constant plane of travel.

24. In a machine of the class described, the combination with a swinging support; cutters shiftably mounted thereon; means to rock the support back and forth; a master plate; a tracer slidably mounted on the support to traverse the master plate and adapted to move relatively to the support while traversing the master plate; means to feed the cutters and tracer step by step in either direction; and means opposed to the yielding movement of the tracer to maintain the swinging support in a constant plane of travel irrespective of the yielding movement of the tracer.

25. In a machine of the class described, the combination with a swinging support; cutters shiftably mounted thereon; means to rock the support back and forth; a master plate; a tracer slidably mounted on the support to traverse the master plate; means to feed the cutters and tracer step by step in either direction; an adjustable guide fixedly mounted relatively to the swinging support; and an anti-friction means opposed to the tracer and carried by the support and traversing the guide to maintain the swinging support in a constant plane of travel.

26. In a machine of the claims described, the combination with a swinging support; cutters shiftably mounted thereon; means to rock the support back and forth; a master plate; a tracer slidably mounted on the support to traverse the master plate; means to feed the cutters and tracer step by step in either direction; an adjustable guide fixedly mounted relatively to the swinging support; and an anti-friction means opposed to the tracer and carried by the support and traversing the guide to maintain the swinging support in a constant plane of travel; the adjustable guide being of an extent equal to the distance through which the tracer may be fed.

27. In a machine of the class described, the combination with a tracer of a master plate; a slotted bracket; a holder hinged to the bracket; the master plate resting on the holder; means to secure the master plate to the holder at a point opposite the slot in the bracket; and means to latch the holder in effective positions to present the master plate to the tracer.

28. In a machine of the class described, the combination with a swinging support; a cutter and a tracer carried by the support; and means to rock the support; of a master plate in the path of the tracer; a slotted bracket; a holder hinged to the bracket; the master plate resting on the holder; means to secure the master plate to the holder at a point opposite the slot in the bracket; means to latch the holder in effective position to present the master plate to the tracer; and a guide secured to the bracket for the means which rocks the swinging support.

29. In a machine of the class described, the combination with a swinging support; and a cutter mounted on the support; of a tracer also mounted on the support; mechanical means to feed the cutter and tracer longitudinally of the support in either direction; and reciprocating means connected directly with the tracer to rock the support, the tracer adapted to connect with the reciprocating means at any point in its longitudinal travel on the support.

30. In a machine of the class described, the combination with a swinging support; and a cutter mounted thereon; of a tracer slidably mounted on the support; a pivotally mounted work carriage movable to and from the cutter; connections between the tracer and the work carriage to actuate the work carriage; and a stationary master plate with which the tracer contacts to control the movement of the work carriage to and from the cutter while the master plate remains stationary.

31. In a machine of the class described, the combination with a suitably mounted swinging support; of a cutter and a tracer shiftably mounted on the support; feeding means to shift the cutter and tracer relatively to the support; the tracer adapted for movement relatively to the support at substantial right angles to its direction of feed; a work carriage; and means to rock the work carriage in one direction; and flexible connections between the tracer and work carriage to enable the tracer to control movement of the work carriage towards and from the cutter.

32. In a machine of the class described, the combination with a swinging support; of a cutter shiftable on the support; a yielding tracer also mounted to shift on the support; means to feed the cutter and the tracer; a work carriage; and connections between the tracer and work carriage, and controlled by the yielding action of the tracer to move the carriage towards and from the cutter.

33. In a machine of the class described, the combination with a swinging support; of a cutter mounted on the support; means to feed the cutter in one plane of travel relatively to the work; means to swing the support, to move the cutter over the work in a plane at substantial right angles to the direction of feed; a movable work carriage; a yielding tracer mounted on the swinging support and partaking of the feeding and swinging movements imparted to the cutter; and connections between the tracer and the work carriage to effect movement of the latter towards and from the cutter.

34. In a machine of the class described, the combination with a swinging support; a cutter shiftably mounted on the support to swing therewith in one direction relatively to the work; means to feed the cutter in another direction relatively to the work; a tracer slide mounted on the swinging support, the feed means operable to shift the tracer slide in one plane relatively to a master plate; a tracer mounted to reciprocate in the slide; a pivoted work carriage; a vibratory finger; means to releasably connect the work carriage and the finger; means to force the work carriage and work towards the cutter; a thrust rod opposed to the means which forces the work carriage towards the cutter; and connections between the yielding tracer and the thrust rod to force the carriage and its work away from the cutter.

35. In a machine of the class described, the combination with a swinging support; of a pivoted work carriage; a cutter shiftably mounted on the support; means to feed the cutter relatively to the work in one plane of movement at substantial right angles to the travel of the swinging support; a tracer carrier shiftably mounted on the swinging support; a tracer mounted for axial reciprocation in the carrier and cooperating with a master plate; means tending to force the work carriage in one direction relatively to the work; and connections operated by the tracer in its axial reciprocations as it passes over the master plate, to force the work carriage in the opposite direction relatively to the work.

36. An engraving machine, including a swinging support; a cutter shiftably mounted on the support; means to rock the support; a tracer carrier shiftably mounted on the support; feed means to shift the cutter and the tracer carrier in a plane of travel at substantial right angles to the direction in which the support is rocked; the feed means arranged to impart a lesser extent of travel to the cutter than to the tracer carrier proportionately; a tracer shiftably supported in the tracer carrier; a pivoted work carriage; means tending to shift the work carriage and work in one direction relatively to the cutter; and means controlled by the tracer as it traverses the master plate, to shift the work carriage and its work in the opposite direction relatively to the cutter.

37. An engraving machine, including a swinging support; means to rock the support; a cutter shiftably mounted on the support; a tracer carrier also shiftably mounted on the support; means to feed the cutter and tracer carrier in a plane of travel substantially at right angles to the direction in which the support is rocked; a tracer shiftably supported in the tracer carrier; a movable finger; means tending to shift the movable finger in one direction relatively to the cutter; means controlled by the tracer as it traverses the master plate, to shift the movable finger in the opposite direction; and a pivoted work carriage releasably connected to the movable finger.

38. An engraving machine, including a hollow column; a tubular trunnion for the column and extending transversely thereof; a cutter slide mounted exteriorly on the column; a tracer slide also shiftably mounted exteriorly on the column; a feed screw located interiorly of the column and longitudinally thereof; connections between the cutter and tracer slides and the feed screw; means to rock the column; and means controlled by the column as it is rocked, to operate the feed screw.

39. An engraving machine including a swinging support; a cutter slide and a tracer slide shiftably mounted on the support; a tracer shiftably mounted in its slide; a tubular trunnion to which the support is fast, the trunnion being slotted longitudinally; a movable finger extending through a slot into the hollow trunnion; a pivoted work carriage releasably connected to the movable finger; means tending to force the finger in one direction; a thrust rod opposed to the last-named means and arranged within the hollow trunnion adjacent the movable finger; a segmental lever, one arm of which extends into the hollow trunnion through a slot therein to coact with the thrust rod; and connections between the tracer and the segmental lever to enable the tracer as it traverses the master plate to control the position of the work carriage relatively to the cutter.

40. An engraving machine, including a swinging support; a cutter shiftably mounted thereon; a tracer carrier also shiftably mounted on the support; means to feed the cutter and the tracer carrier automatically; a tracer shiftably mounted in its carrier; means normally engaged with the tracer in any of its adjusted positions, to rock the swinging support; and means connected with the tracer to disengage it from the last-named means.

41. An engraving machine, including a swinging support; a tracer carrier adjustable longitudinally on the support; a tracer shiftable in its carrier; means normally engaged with the tracer in any of its longitudinally adjusted positions to rock the support; and means to shift the tracer in its carrier to disengage the tracer from the last-named means.

42. An engraving machine, including a swinging support; a tracer carrier and a cutter carried by and slidable relatively to the support; a tracer shiftable relatively to its carrier; a work carriage; means to shift the work carriage in one direction relatively to the cutter; connections between the tracer and work carriage to shift the latter under control of the tracer, in the opposite direction; means normally engaged by the tracer to rock the swinging support; and manually operable means to control the connection between the tracer and work carriage, to withdraw the tracer from engagement with the means for rocking the swinging support.

43. An engraving machine, including a swinging support pivoted intermediate its ends; cutters carried by the support on opposite sides of its pivot, and slidable on the support; a tracer carrier mounted on the support; feed means for the cutters and tracer carrier; a tracer in the carrier to traverse the face of a master plate; means to rock the swinging support; a work carriage shiftable towards and from the cutters, under control of the tracer; and work-supporting mandrels rotatably mounted in the work carriage at points opposite the cutters.

44. An engraving machine, including a swinging support; a cutter and a tracer mounted on the support; means to feed the cutter and tracer relatively to the support; means to rock the support; a work carriage shiftable towards and from the cutter; a work mandrel rotatably supported in the work carriage; means to index the work mandrel; and means to hold the mandrel where indexed.

45. An engraving machine, including a swinging support; a cutter and a tracer mounted on the support; means to feed the cutter and tracer relatively to the support; means to rock the support; a work carriage shiftable towards and from the cutter; a work mandrel rotatably supported in the work carriage to carry the work; means to index the work mandrel; and means engageable with the work to hold the latter where indexed.

46. An engraving machine, including a swinging support; a cutter and a tracer mounted on the support; means to feed the cutter and tracer relatively to the work and to a master plate, respectively; means to rock the support; an oscillatory mechanism connected with the tracer; and a shiftable work carriage releasably connected with the oscillatory mechanism.

47. An engraving machine, including a support; a cutter mounted thereon; means to shift the support and the cutter in one plane of travel; means to feed the cutter in another plane of travel; a work carriage, oscillatory mechanism to control movement of the work in a third direction; a gage interposed between the carriage and oscillatory mechanism; and a latch mounted in the gage, and adapted to releasably connect the work carriage and the oscillatory mechanism.

48. An engraving machine, including a support; a cutter mounted thereon; means to shift the support and the cutter in one plane of travel; means to feed the cutter in another plane of travel; a work carriage, oscillatory mechanism to control movement of the work in a third direction; a gage interposed between the carriage and oscillatory mechanism; and a latch adapted to releasably connect the work carriage and the oscillatory mechanism, irrespective of the adjustment of the gage.

49. An engraving machine including a work carriage; a support; means to shift the support back and forth relatively to the work on the work carriage; a tracer to coact with a master plate; connections between the tracer and the work carriage to move the latter towards and from the support; a slide mounted on the support; means to feed the slide relatively to the support; and a unitary assembly comprising a cutter, cutter spindle and motor individual thereto removably mounted as a whole on the slide.

50. An engraving machine including a work carriage; a support; means to shift the support back and forth relatively to the work on the work carriage; a tracer to coact with a master plate; a unitary assembly comprising a cutter, a cutter spindle, and a motor individual thereto and connected to the cutter spindle, such assembly removably mounted on the support; and means to feed the unit assembly bodily relatively to the support.

51. In a machine of the class described, the combination with a support; of a slide mounted thereon; a split sleeve on the slide; a portable motor; a bushing secured thereto; a cutter spindle journaled in the bushing and driven by the motor; a cutter on the spindle; the bushing being insertable into and removable from the sleeve; and stops to determine the relative positions of the bushing and sleeve.

52. In a machine of the class described; the combination with a master plate having a character in relief with certain angular slopes; and a work carriage; of a tracer; a cutter controlled by the tracer; means intermediate the tracer and cutter to move the cutter in a plurality of directions according to a certain ratio between the tracer and cutter, and in another direction according to a different ratio between the tracer and cutter, to enable the cutter to engrave the work in relief with different angular slopes than the master slopes.

53. In a machine of the class described; the combination with a master plate having a character in relief with gentle slopes; and a work carriage; of a tracer; a cutter controlled by the tracer; means intermediate the tracer and the cutter to move the cutter in two directions according to a certain ratio between the tracer and cutter, and in another direction according to a different ratio between the tracer and the cutter; to engrave the work in relief with steeper slopes than the master slopes.

54. In a machine of the class described, having a tracer and a cutter working in conjunction with a master plate and a workpiece, a swinging support, means to feed the cutter in one direction by imparting a swinging movement to the support, and additional means on the support operating to impart a relative feeding movement between the cutter and the workpiece, in a different direction.

55. In a machine of the class described, having a tracer and a cutter working in conjunction with a master plate and a work-piece, a swinging support, means to feed the cutter in one direction by imparting a swinging movement to the support, and a ratchet device on the support operating to give the cutter a feeding movement in a different direction.

56. In a machine of the class described, the combination with cutters; a tracer; a swinging member to support the cutters and the tracer; and a stationary master plate; of mechanism to swing the member to move the tracer across the face of the matser plate, the tracer adapted to reciprocate on the swinging member as it passes over the face of the master plate; automatic means to feed the tracer and cutters on the swinging member in a direction at right angles to the swinging movement of the member; a pivoted work carriage; and connections between the tracer and the work carriage actuated by the tracer as the tracer is reciprocated in passing over the face of the master plate to reciprocate the work carriage to move the work to and away from the cutters.

HOWARD B. SCOTT.
EDGAR WARNER.